(12) United States Patent
Xiong et al.

(10) Patent No.: US 10,683,970 B2
(45) Date of Patent: *Jun. 16, 2020

(54) LED TUBE LAMP FOR OPERATING IN DIFFERENT MODES

(71) Applicant: JIAXING SUPER LIGHTING ELECTRIC APPLIANCE CO., LTD, Jiaxing (CN)

(72) Inventors: Aiming Xiong, Jiaxing (CN); Xintong Liu, Shanghai (CN); Xiaojia Wu, Jinhua (CN)

(73) Assignee: JIAXING SUPER LIGHTING ELECTRIC APPLIANCE CO., LTD, Jiaxing, Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,319

(22) Filed: Aug. 21, 2019

(65) Prior Publication Data

US 2019/0376651 A1  Dec. 12, 2019

Related U.S. Application Data

(63) Continuation of application No. 16/256,075, filed on Jan. 24, 2019, now Pat. No. 10,571,080, which is a
(Continued)

(30) Foreign Application Priority Data

Oct. 10, 2015 (CN) .......................... 2015 1 0651572
Jan. 22, 2016 (CN) .......................... 2016 1 0043864
(Continued)

(51) Int. Cl.
*G05F 1/00* (2006.01)
*H05B 37/02* (2006.01)
(Continued)

(52) U.S. Cl.
CPC ............ *F21K 9/278* (2016.08); *B23K 1/0016* (2013.01); *B23K 3/047* (2013.01); *F21K 9/275* (2016.08);
(Continued)

(58) Field of Classification Search
None
See application file for complete search history.

(56) References Cited

U.S. PATENT DOCUMENTS 6,762,562 B2  7/2004  Leong
6,853,151 B2  2/2005  Leong et al.
(Continued)

FOREIGN PATENT DOCUMENTS

CN  200965185 Y  10/2007
CN  101352105 A  1/2009
(Continued)

*Primary Examiner* — Anh Q Tran
(74) *Attorney, Agent, or Firm* — Simon Kuang Lu

(57) ABSTRACT

An LED tube lamp comprises: an LED module for emitting light; a rectifying circuit for rectifying an external driving signal to produce a rectified signal; and a mode determination circuit for determining to perform a first mode or a second mode of lighting according to the rectified signal; wherein the mode determination circuit comprises two voltage dividers for producing a first fraction voltage and a second fraction voltage of the rectified signal, and a control circuit coupled to the two voltage dividers and configured for receiving the first fraction voltage and for receiving the second fraction voltage. When the first fraction voltage signal is in a first voltage range, the mode determination circuit determines to perform the first mode of lighting; and when the second fraction voltage is in a second voltage range, the mode determination circuit determines to perform the second mode of lighting.

10 Claims, 10 Drawing Sheets

Related U.S. Application Data continuation of application No. 15/701,211, filed on Sep. 11, 2017, now Pat. No. 10,208,898, which is a continuation-in-part of application No. 15/258,471, filed on Sep. 7, 2016, now Pat. No. 9,775,215, which is a continuation-in-part of application No. 15/211,813, filed on Jul. 15, 2016, now Pat. No. 9,756,698, which is a continuation-in-part of application No. 15/150,458, filed on May 10, 2016, now Pat. No. 9,794,990, which is a continuation-in-part of application No. 14/865,387, filed on Sep. 25, 2015, now Pat. No. 9,609,711, and a continuation-in-part of application No. 14/699,138, filed on Apr. 29, 2015, now Pat. No. 9,480,109, said application No. 15/258,471 is a continuation-in-part of application No. 15/211,783, filed on Jul. 15, 2016, now Pat. No. 9,885,449, which is a continuation-in-part of application No. 15/087,088, filed on Mar. 31, 2016, now Pat. No. 9,879,852, which is a continuation-in-part of application No. 14/865,387, filed on Sep. 25, 2015, now Pat. No. 9,609,711.

(30) Foreign Application Priority Data

| | | |
|---|---|---|
| May 27, 2016 | (CN) | 2016 1 0363805 |
| Nov. 10, 2016 | (CN) | 2016 1 0990012 |
| Nov. 30, 2016 | (CN) | 2016 1 1090717 |
| May 2, 2017 | (CN) | 2017 1 0307204 |

(51) Int. Cl.

| | |
|---|---|
| H05B 39/04 | (2006.01) |
| H05B 41/36 | (2006.01) |
| F21K 9/278 | (2016.01) |
| F21V 17/10 | (2006.01) |
| F21V 23/00 | (2015.01) |
| F21V 23/02 | (2006.01) |
| F21V 29/83 | (2015.01) |
| F21K 9/275 | (2016.01) |
| B23K 3/047 | (2006.01) |
| B23K 1/00 | (2006.01) |
| F21V 15/015 | (2006.01) |
| F21V 3/06 | (2018.01) |
| F21V 3/10 | (2018.01) |
| H05B 45/37 | (2020.01) |
| H05B 45/50 | (2020.01) |
| C03C 21/00 | (2006.01) |
| F21V 29/70 | (2015.01) |
| F21Y 115/10 | (2016.01) |
| B23K 101/42 | (2006.01) |

(52) U.S. Cl.
CPC ............... *F21V 3/061* (2018.02); *F21V 3/10* (2018.02); *F21V 15/015* (2013.01); *F21V 17/101* (2013.01); *F21V 23/006* (2013.01); *F21V 23/009* (2013.01); *F21V 23/02* (2013.01); *F21V 29/83* (2015.01); *H05B 45/37* (2020.01); *H05B 45/50* (2020.01); *B23K 2101/42* (2018.08); *C03C 21/002* (2013.01); *F21V 29/70* (2015.01); *F21Y 2115/10* (2016.08); *Y02B 20/341* (2013.01)

(56) References Cited

U.S. PATENT DOCUMENTS

| | | | |
|---|---|---|---|
| 7,067,992 | B2 | 6/2006 | Leong et al. |
| 7,380,961 | B2 | 6/2008 | Moriyama |
| 8,729,809 | B2 | 5/2014 | Kit et al. |
| 8,796,943 | B2 | 8/2014 | Miyamichi |
| 8,870,415 | B2 | 10/2014 | Ivey |
| 8,896,207 | B2 | 11/2014 | Thomas et al. |
| 9,000,668 | B2 | 4/2015 | Qiu |
| 9,210,774 | B2 | 12/2015 | Kim et al. |
| 9,288,867 | B2 | 3/2016 | Hsia et al. |
| 9,445,463 | B2 | 9/2016 | Choi et al. |
| 9,526,133 | B2 | 12/2016 | Tao et al. |
| 9,609,711 | B2 | 3/2017 | Jiang et al. |
| 9,629,211 | B2 | 4/2017 | Xiong et al. |
| 9,629,215 | B2 | 4/2017 | Xiong et al. |
| 9,629,216 | B2 | 4/2017 | Jiang et al. |
| 9,723,662 | B2 * | 8/2017 | Ye et al. |
| 9,756,698 | B2 * | 9/2017 | Xiong ................ H05B 33/0887 |
| 9,794,990 | B2 | 10/2017 | Ye et al. |
| 10,208,898 | B2 | 2/2019 | Xiong et al. |
| 2009/0160369 | A1 | 6/2009 | Godbole et al. |
| 2010/0102729 | A1 | 4/2010 | Katzir et al. |
| 2010/0181925 | A1 | 7/2010 | Ivey et al. |
| 2010/0220469 | A1 | 9/2010 | Ivey et al. |
| 2011/0043127 | A1 | 2/2011 | Yamasaki |
| 2011/0057572 | A1 | 3/2011 | Kit et al. |
| 2011/0084554 | A1 | 4/2011 | Tian |
| 2011/0121756 | A1 | 5/2011 | Thomas et al. |
| 2011/0176297 | A1 | 7/2011 | Hsia et al. |
| 2011/0228526 | A1 | 9/2011 | Hartikka et al. |
| 2011/0291592 | A1 | 12/2011 | Anissimov |
| 2012/0026761 | A1 | 2/2012 | Young |
| 2012/0181952 | A1 | 7/2012 | Roeer |
| 2012/0248986 | A1 | 10/2012 | Gibbs |
| 2012/0248989 | A1 | 10/2012 | Ikami |
| 2012/0299501 | A1 | 11/2012 | Kost et al. |
| 2012/0300445 | A1 | 11/2012 | Chu et al. |
| 2012/0313540 | A1 | 12/2012 | Lin et al. |
| 2013/0127327 | A1 | 5/2013 | Heil et al. |
| 2013/0147350 | A1 | 6/2013 | Yang |
| 2013/0313983 | A1 | 11/2013 | Radermacher |
| 2013/0320869 | A1 | 12/2013 | Jans et al. |
| 2013/0335959 | A1 | 12/2013 | Hsia et al. |
| 2014/0035463 | A1 | 2/2014 | Miyamichi |
| 2014/0055029 | A1 | 2/2014 | Jans |
| 2014/0062320 | A1 | 3/2014 | Urano et al. |
| 2014/0117853 | A1 | 5/2014 | Miyamichi |
| 2014/0239834 | A1 | 8/2014 | Choi et al. |
| 2014/0265899 | A1 | 9/2014 | Sadwick |
| 2014/0265900 | A1 | 9/2014 | Sadwick et al. |
| 2015/0077001 | A1 | 3/2015 | Takahashi et al. |
| 2015/0173138 | A1 | 6/2015 | Roberts |
| 2015/0176770 | A1 | 6/2015 | Wilcox et al. |
| 2015/0181661 | A1 | 6/2015 | Hsia et al. |
| 2015/0195889 | A1 | 7/2015 | Chou et al. |
| 2015/0366008 | A1 | 12/2015 | Barnetson et al. |
| 2016/0081147 | A1 | 3/2016 | Guang |
| 2016/0091147 | A1 | 3/2016 | Jiang et al. |
| 2016/0113091 | A1 | 4/2016 | Tao |
| 2016/0286621 | A1 | 9/2016 | Tao et al. |
| 2016/0316533 | A1 | 10/2016 | Hsia |
| 2016/0381760 | A1 | 12/2016 | Xiong et al. |
| 2017/0094746 | A1 | 3/2017 | Xiong et al. |
| 2017/0105263 | A1 | 4/2017 | Xiong et al. |

FOREIGN PATENT DOCUMENTS

| | | |
|---|---|---|
| CN | 101715265 A | 5/2010 |
| CN | 201515528 U | 6/2010 |
| CN | 102155642 A | 8/2011 |
| CN | 102355780 A | 2/2012 |
| CN | 102155642 B | 2/2013 |
| CN | 102932997 A | 2/2013 |
| CN | 101715265 B | 8/2013 |
| CN | 103563490 A | 2/2014 |
| CN | 103822121 A | 5/2014 |
| CN | 102932997 B | 8/2014 |
| CN | 204291454 U | 4/2015 |
| CN | 104735873 A | 6/2015 |
| CN | 204741593 U | 11/2015 |
| CN | 204795749 U | 11/2015 |
| CN | 104470086 B | 6/2017 |

(56) References Cited

FOREIGN PATENT DOCUMENTS

| | | |
|---|---:|---:|
| EP | 2914065 A2 | 9/2015 |
| GB | 2533683 A | 6/2016 |
| WO | 2012139691 A1 | 10/2012 |
| WO | 2013150417 A1 | 10/2013 |
| WO | 2014206785 A1 | 12/2014 |
| WO | 2015028329 A1 | 3/2015 |
| WO | 2015028639 A1 | 3/2015 |
| WO | 2015066566 A1 | 5/2015 |
| WO | 2015074917 A1 | 5/2015 |
| WO | 2016187846 A1 | 12/2016 |
| WO | 2017012512 A1 | 1/2017 |

* cited by examiner

LED TUBE LAMP FOR OPERATING IN DIFFERENT MODES

CROSS-REFERENCE TO RELATED APPLICATIONS

This application is a continuation application of U.S. patent application Ser. No. 16/256,075, filed Jan. 24, 2019, which is a continuation application of U.S. patent application Ser. No. 15/701,211, filed Set. 11, 2017, which is a continuation-in-part application of U.S. patent application Ser. No. 15/258,471, filed Sep. 7, 2016, which is a continuation-in-part application of U.S. patent application Ser. No. 15/211,813, filed Jul. 15, 2016, which is a continuation-in-part application of U.S. patent application Ser. No. 15/150,458, filed May 10, 2016, which is a continuation-in-part application of U.S. patent application Ser. No. 14/865,387, filed Sep. 25, 2015, the contents of which applications are incorporated herein by reference in their entirety. U.S. patent application Ser. No. 15/258,471 is also a continuation-in-part application of U.S. patent application Ser. No. 15/211,783, filed Jul. 15, 2016, which is a continuation-in-part application of U.S. patent application Ser. No. 15/087,088, filed Mar. 31, 2016, which is a continuation-in-part application of U.S. patent application Ser. No. 14/865,387, filed Sep. 25, 2015, the contents of each of which are incorporated herein by reference in their entirety.

U.S. patent application Ser. No. 16/256,075 claims priority under 35 U.S.C. 119(e) to Chinese Patent Applications Nos.: CN 201510651572.0, filed on 2015 Oct. 10; CN 201610043864.0, filed on 2016 Jan. 22; CN 201610363805.1, filed on 2016 May 27; CN 201610990012.2, filed on 2016 Nov. 10; CN 201611090717.5, filed on 2016 Nov. 30; CN 201710307204.3, filed on 2017 May 2, the contents of which priority applications are incorporated herein by reference in their entirety.

If any terms in this application conflict with terms used in any application(s) to which this application claims priority, or terms incorporated by reference into this application or the application(s) to which this application claims priority, a construction based on the terms as used or defined in this application should be applied.

TECHNICAL FIELD

The present disclosure relates to illumination devices, and more particularly relates to an LED tube lamp with a detection circuit for detecting whether the LED tube lamp is being supplied by an incompatible ballast or for regulating the continuity of current to flow through its LED unit(s) used to emit light, or a protection circuit for providing overvoltage and/or overcurrent protection.

RELATED ART

LED (light emitting diode) lighting technology is rapidly developing to replace traditional incandescent and fluorescent lightings. LED tube lamps are mercury-free in comparison with fluorescent tube lamps that need to be filled with inert gas and mercury. Thus, it is not surprising that LED tube lamps are becoming a highly desired illumination option among different available lighting systems used in homes and workplaces, which used to be dominated by traditional lighting options such as compact fluorescent light bulbs (CFLs) and fluorescent tube lamps. Benefits of LED tube lamps include improved durability and longevity and far less energy consumption; therefore, when taking into account all factors, they would typically be considered as a cost effective lighting option.

Typical LED tube lamps have a lamp tube, a circuit board disposed inside the lamp tube with light sources being mounted on the circuit board, and end caps accompanying a power supply provided at two ends of the lamp tube with the electricity from the power supply transmitted to the light sources through the circuit board. However, existing LED tube lamps have certain drawbacks.

First, the typical circuit board is rigid and allows the entire lamp tube to maintain a straight tube configuration when the lamp tube is partially ruptured or broken, and this gives the user a false impression that the LED tube lamp remains usable and is likely to cause the user to be electrically shocked upon handling or installation of the LED tube lamp.

Second, the rigid circuit board is typically electrically connected with the end caps by way of wire bonding, in which the wires may be easily damaged and even broken due to any move during manufacturing, transportation, and usage of the LED tube lamp and therefore may disable the LED tube lamp.

Further, circuit design of current LED tube lamps mostly doesn't provide suitable solutions for complying with relevant certification standards and for better compatibility with the driving structure using a ballast originally for a fluorescent lamp. For example, since there are usually no electronic components in a fluorescent lamp, it's fairly easy for a fluorescent lamp to be certified under EMI (electromagnetic interference) standards and safety standards for lighting equipment as provided by Underwriters Laboratories (UL). However, there are a considerable number of electronic components in an LED tube lamp, and therefore consideration of the impacts caused by the layout (structure) of the electronic components is important, resulting in difficulties in complying with such standards.

Common main types of electrical ballast include instant-start ballast and programmed-start ballast. Electrical ballast typically includes a resonant circuit and is designed to match the loading characteristics of a fluorescent lamp in driving the fluorescent lamp. For example, for properly starting a fluorescent lamp, the ballast provides driving methods respectively corresponding to the fluorescent lamp working as a capacitive device before emitting light, and working as a resistive device upon emitting light. But an LED is a nonlinear component with significantly different characteristics from a fluorescent lamp. Therefore, using an LED tube lamp with a ballast impacts the resonant circuit design of the ballast, which may cause a compatibility problem. Generally, a programmed-start ballast will detect the presence of a filament in a fluorescent lamp, but traditional LED driving circuits cannot support the detection and may cause a failure of the filament detection and thus failure of the starting of the LED tube lamp.

SUMMARY

It's specially noted that the present disclosure may actually include one or more inventions claimed currently or not yet claimed, and for avoiding confusion due to unnecessarily distinguishing between those possible inventions at the stage of preparing the specification, the possible plurality of inventions herein may be collectively referred to as "the (present) invention" herein.

According to an aspect of the disclosed embodiment, a light emitting diode (LED) tube lamp configured to receive an external driving signal includes an LED module for emitting light, the LED module comprising an LED unit comprising an LED; a rectifying circuit for rectifying the external driving signal to produce a rectified signal, the rectifying circuit having a first output terminal and a second output terminal for outputting the rectified signal; a filtering circuit connected to the LED module, and configured to provide a filtered signal for the LED unit; and a protection circuit for providing protection for the LED tube lamp. The protection circuit includes a voltage divider comprising two elements connected in series between the first and second output terminals of the rectifying circuit, for producing a signal at a connection node between the two elements; and a control circuit coupled to the connection node between the two elements, for receiving, and detecting a state of, the signal at the connection node. The control circuit includes or is coupled to a switching circuit coupled to the rectifying circuit, and the switching circuit is configured to be triggered on or off by the detected state, upon the external driving signal being input to the LED tube lamp, to allow discontinuous current to flow through the LED unit.

According to another aspect of the disclosed invention, a light emitting diode (LED) tube lamp configured to receive an external driving signal includes: an LED module for emitting light, the LED module comprising an LED unit comprising an LED; a rectifying circuit for rectifying the external driving signal to produce a rectified signal, the rectifying circuit having a first output terminal and a second output terminal for outputting the rectified signal; a filtering circuit connected to the LED module, and configured to provide a filtered signal for the LED unit; and a detection circuit coupled between the rectifying circuit and the LED module. The detection circuit includes a voltage divider comprising two elements connected in series between the first and second output terminals of the rectifying circuit, for producing a signal at a connection node between the two elements, a control circuit coupled to the connection node between the two elements, for receiving, and detecting a state of, the signal at the connection node. The control circuit includes or is coupled to a switching circuit coupled to the rectifying circuit, and the detection circuit is configured such that when the external driving signal is input to the LED tube lamp, for preventing an overcurrent condition the control circuit is triggered by the detected state to output a signal to a control terminal of the switching circuit to turn on or conduct the switching circuit, wherein the conducting state of the switching circuit eventually dims the light emitted by the LED unit.

According to another aspect of the disclosed embodiments, a light emitting diode (LED) tube lamp configured to receive an external driving signal includes: a lamp tube; a first external connection terminal and a second external connection terminal coupled to the lamp tube and for receiving the external driving signal; an LED module for emitting light, the LED module comprising an LED unit comprising an LED; a rectifying circuit for rectifying the external driving signal to produce a rectified signal, the rectifying circuit having a first output terminal and a second output terminal for outputting the rectified signal; a filtering circuit coupled to the rectifying circuit and the LED module; and a detection circuit coupled between the rectifying circuit and the LED module. The detection circuit includes a voltage divider comprising two elements connected in series between the first and second output terminals of the rectifying circuit, for producing a fraction voltage at a connection node between the two elements, and a controller coupled to the connection node between the two elements, for receiving the fraction voltage at the connection node. The LED tube lamp further includes a converter circuit coupled between the controller and the LED module, for converting a signal from the controller or the rectifying circuit into a driving signal for driving the LED module. The controller includes or is coupled to a switch coupled to the converter circuit, and the detection circuit is configured such that when the fraction voltage is in a defined voltage range, the controller regulates the continuity of current to flow through the LED unit by alternately turning on and off the switch.

In addition to using the ballast interface circuit or mode determination circuit to facilitate the LED tube lamp starting by the electrical ballast, other innovations of mechanical structures of the LED tube lamp disclosed herein, such as the LED tube lamp including improved structures of a flexible circuit board or a bendable circuit sheet, and soldering features of the bendable circuit sheet and a printed circuit board bearing the power supply module of the LED tube lamp, may also be used to improve the stability of power supplying by the ballast and to provide strengthened conductive path through, and connections between, the power supply module and the bendable circuit sheet.

DETAILED DESCRIPTION

The present disclosure provides a novel LED tube lamp, and also provides some features that can be used in LED lamps that are not LED tube lamps. The present disclosure will now be described in the following embodiments with reference to the drawings. The following descriptions of various implementations are presented herein for purpose of illustration and giving examples only. This invention is not intended to be exhaustive or to be limited to the precise form disclosed. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
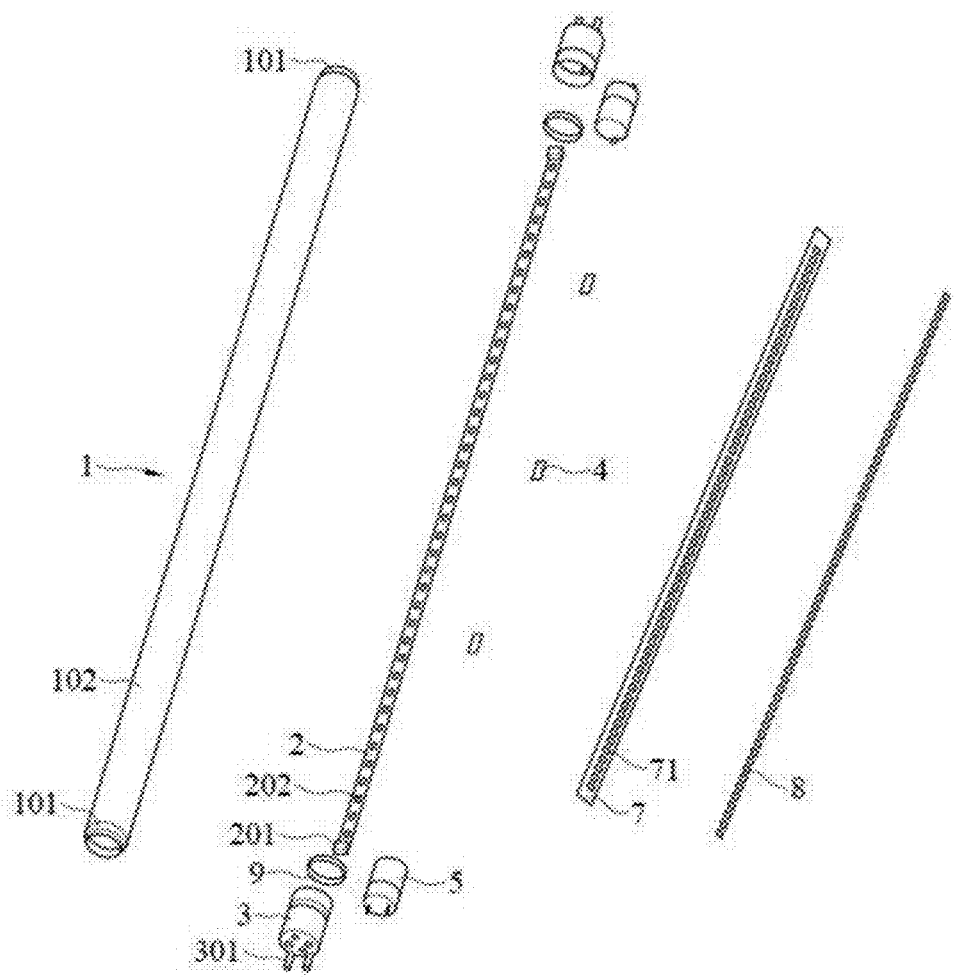
FIG. 1 is an exemplary exploded view schematically illustrating an exemplary LED tube lamp, according to certain embodiments.
Figure 2:
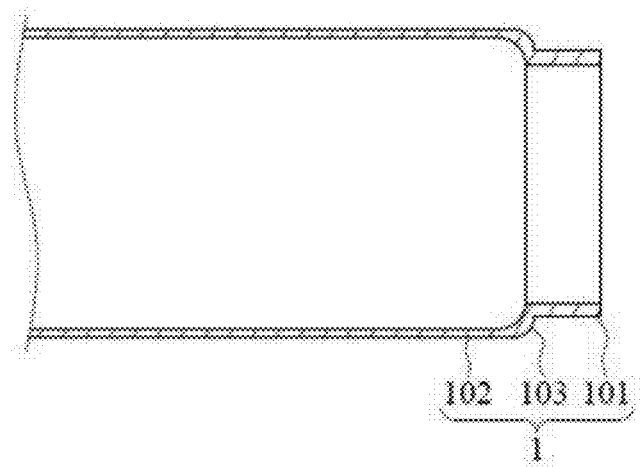
FIG. 2 is a plan cross-sectional view schematically illustrating an example of an end structure of a lamp tube of an LED tube lamp according to certain embodiments.

Referring to FIG. 1 and FIG. 2, a glass made lamp tube of an LED tube lamp according to an exemplary embodiment of the present invention has structure-strengthened end regions described as follows. The glass made lamp tube 1 includes a main body region 102, two rear end regions 101 (or just end regions 101) respectively formed at two ends of the main body region 102, and end caps 3 that respectively sleeve the rear end regions 101. The outer diameter of at least one of the rear end regions 101 is less than the outer diameter of the main body region 102. In the embodiment of FIGS. 1 and 2, the outer diameters of the two rear end regions 101 are less than the outer diameter of the main body region 102. In addition, the surface of the rear end region 101 may be parallel to the surface of the main body region 102 in a cross-sectional view. Specifically, in some embodiments, the glass made lamp tube 1 is strengthened at both ends, such that the rear end regions 101 are formed to be strengthened structures. In certain embodiments, the rear end regions 101 with strengthened structure are respectively sleeved with the end caps 3, and the outer diameters of the end caps 3 and the main body region 102 have little or no differences. For example, the end caps 3 may have the same or substantially the same outer diameters as that of the main body region 102 such that there is no gap between the end caps 3 and the main body region 102. In this way, a supporting seat in a packing box for transportation of the LED tube lamp contacts not only the end caps 3 but also the lamp tube 1 and makes uniform the loadings on the entire LED tube lamp to avoid situations where only the end caps 3 are forced, therefore preventing breakage at the connecting portion between the end caps 3 and the rear end regions 101 due to stress concentration. The quality and the appearance of the product are therefore improved.

In one embodiment, the end caps 3 and the main body region 102 have substantially the same outer diameters. These diameters may have a tolerance for example within +/−0.2 millimeter (mm), or in some cases up to +/−1.0 millimeter (mm). Depending on the thickness of the end caps 3, the difference between an outer diameter of the rear end regions 101 and an outer diameter of the main body region 102 can be about 1 mm to about 10 mm for typical product applications. In some embodiments, the difference between the outer diameter of the rear end regions 101 and the outer diameter of the main body region 102 can be about 2 mm to about 7 mm.

Referring to FIG. 2, the lamp tube 1 is further formed with a transition region 103 between the main body region 102 and the rear end regions 101. In one embodiment, the transition region 103 is a curved region formed to have cambers at two ends to smoothly connect the main body region 102 and the rear end regions 101, respectively. For example, the two ends of the transition region 103 may be arc-shaped in a cross-section view along the axial direction of the lamp tube 1. Furthermore, one of the cambers connects the main body region 102 while the other one of the cambers connects the rear end region 101. In some embodiments, the arc angle of the cambers is greater than 90 degrees while the outer surface of the rear end region 101 is a continuous surface in parallel with the outer surface of the main body region 102 when viewed from the cross-section along the axial direction of the lamp tube. In other embodiments, the transition region 103 can be without curve or arc in shape. In certain embodiments, the length of the transition region 103 along the axial direction of the lamp tube 1 is between about 1 mm to about 4 mm. Upon experimentation, it was found that when the length of the transition region 103 along the axial direction of the lamp tube 1 is less than 1 mm, the strength of the transition region would be insufficient; when the length of the transition region 103 along the axial direction of the lamp tube 1 is more than 4 mm, the main body region 102 would be shorter and the desired illumination surface would be reduced, and the end caps 3 would be longer and the more materials for the end caps 3 would be needed.

Figure 3:
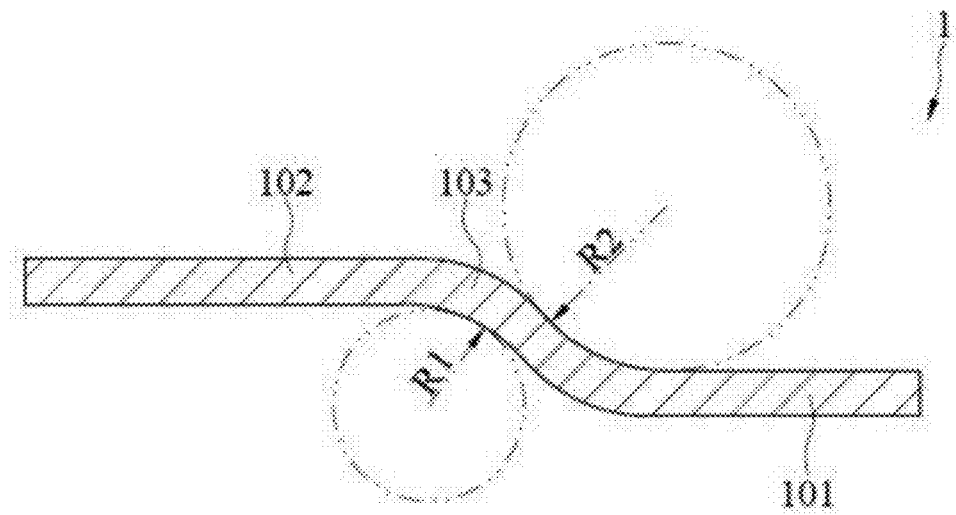
FIG. 3 is an exemplary plan cross-sectional view schematically illustrating an exemplary local structure of the transition region of the end of the lamp tube of FIG. 2.

As can be seen in FIG. 2, and in the more detailed closer-up depiction in FIG. 3, in certain embodiments, in the transition region 103, the lamp tube 1 narrows, or tapers to have a smaller diameter when moving along the length of the lamp tube 1 from the main region 102 to the end region 101. The tapering/narrowing may occur in a continuous, smooth manner (e.g., to be a smooth curve without any linear angles). By avoiding angles, in particular any acute angles, the lamp tube 1 is less likely to break or crack under pressure.

Referring to FIG. 3, in certain embodiments, the lamp tube 1 is made of glass, and has a rear end region 101, a main body region 102, and a transition region 103. The transition region 103 has two arc-shaped cambers at both ends to from an S shape; one camber positioned near the main body region 102 is convex outwardly, while the other camber positioned near the rear end region 101 is concaved inwardly. Generally speaking, the radius of curvature, R1, of the camber/arc between the transition region 103 and the main body region 102 is smaller than the radius of curvature, R2, of the camber/arc between the transition region 103 and the rear end region 101.

Figure 4:
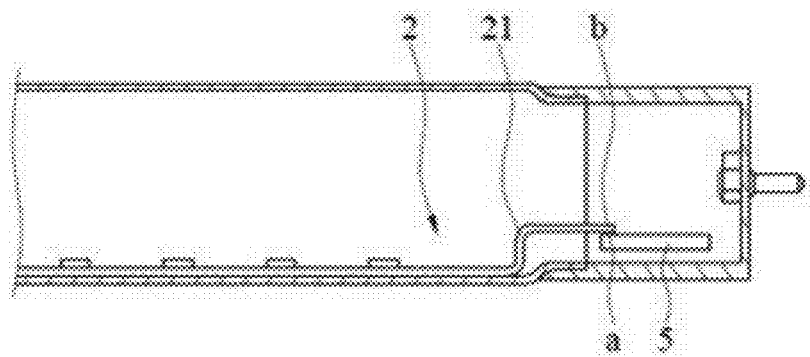
FIG. 4 is a sectional view schematically illustrating an LED light strip that includes a bendable circuit sheet with ends thereof passing across a transition region of a lamp tube of an LED tube lamp to be soldering bonded to the output terminals of the power supply according to an exemplary embodiment.
Figure 9:
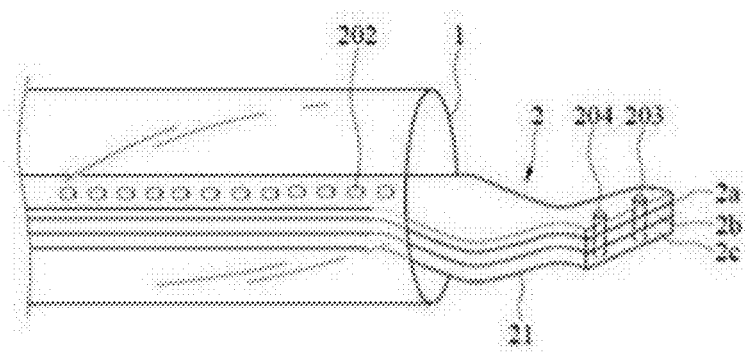
FIG. 9 is a perspective view schematically illustrating a bendable circuit sheet of an LED light strip formed with two conductive wiring layers according to another exemplary embodiment.

Referring to FIG. 4 and FIG. 9, an LED tube lamp in accordance with an exemplary embodiment includes a lamp tube 1, which may be formed of glass and may be referred to herein as a glass lamp tube 1; two end caps respectively disposed at two ends of the glass lamp tube 1; a power supply 5; and an LED light strip 2 disposed inside the glass lamp tube 1. For example, the end cap and the lamp tube are connected to each other in an adhesive manner such that there is no gap between the end cap and the lamp tube or there are extremely small gaps between the end cap and the lamp tube. The glass lamp tube 1 extending in a first direction along a length of the glass lamp tube 1 includes a main body region, a rear end region, and a transition region connecting the main body region and the rear end region, wherein the main body region and the rear end region are substantially parallel. As shown in the embodiment of FIG. 4, the bendable circuit sheet 2 (as an embodiment of the light strip 2) passes through a transition region to be soldered or traditionally wire-bonded with the power supply 5, and then the end cap of the LED tube lamp is adhered to the transition region, respectively to form a complete LED tube lamp. As discussed herein, a transition region of the lamp tube refers to regions outside a central portion of the lamp tube and inside terminal ends of the lamp tube. For example, a central portion of the lamp tube may have a constant diameter, and each transition region between the central portion and a terminal end of the lamp tube may have a changing diameter (e.g., at least part of the transition region may become more narrow moving in a direction from the central portion to the terminal end of the lamp tube). End caps including the power supply may be disposed at the terminal ends of the lamp tube, and may cover part of the transition region.

Figure 5:
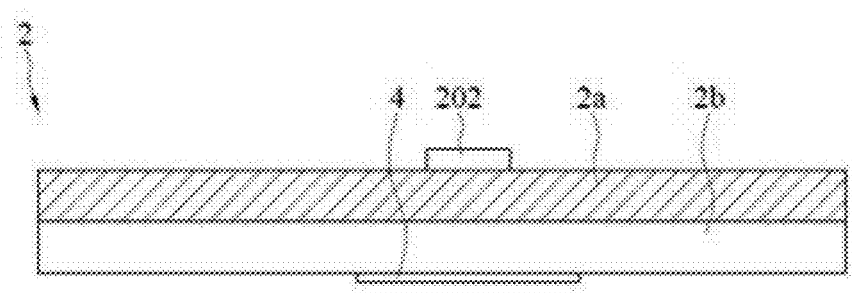
FIG. 5 is a cross-sectional view schematically illustrating a bi-layered structure of a bendable circuit sheet of an LED light strip of an LED tube lamp according to an exemplary embodiment.

With reference to FIG. 5, in this embodiment, the LED light strip 2 is fixed by the adhesive sheet 4 to an inner circumferential surface of the lamp tube 1, so as to increase the light illumination angle of the LED tube lamp and broaden the viewing angle to be greater than 330 degrees.

In some embodiments, the light strip 2 may be an elongated aluminum plate, FR 4 board, or a bendable circuit sheet. When the lamp tube 1 is made of glass, adopting a rigid aluminum plate or FR4 board would make a broken lamp tube, e.g., broken into two parts, remain a straight shape so that a user may be under a false impression that the LED tube lamp is still usable and fully functional, and it is easy for the user to incur electric shock upon handling or installation of the LED tube lamp. Because of added flexibility and bendability of the flexible substrate for the LED light strip 2, the problem faced by the aluminum plate, FR4 board, or conventional 3-layered flexible board having inadequate flexibility and bendability, are thereby addressed. In certain embodiments, a bendable circuit sheet is adopted as the LED light strip 2 because such an LED light strip 2 would not allow a ruptured or broken lamp tube to maintain a straight shape and therefore would instantly inform the user of the disability of the LED tube lamp to avoid possibly incurred electrical shock. The following are further descriptions of a bendable circuit sheet that may be used as the LED light strip 2.

Referring to FIG. 5, in one embodiment, the LED light strip 2 includes a bendable circuit sheet having a conductive wiring layer 2a and a dielectric layer 2b that are arranged in a stacked manner, wherein the wiring layer 2a and the dielectric layer 2b have same areas. The LED light source 202 is disposed on one surface of the wiring layer 2a, the dielectric layer 2b is disposed on the other surface of the wiring layer 2a that is away from the LED light sources 202 (e.g., a second, opposite surface from the first surface on which the LED light source 202 is disposed). The wiring layer 2a is electrically connected to the power supply 5 to carry direct current (DC) signals. Meanwhile, the surface of the dielectric layer 2b away from the wiring layer 2a (e.g., a second surface of the dielectric layer 2b opposite a first surface facing the wiring layer 2a) is fixed to the inner circumferential surface of the lamp tube 1 by means of the adhesive sheet 4. The portion of the dielectric layer 2b fixed to the inner circumferential surface of the lamp tube 1 may substantially conform to the shape of the inner circumferential surface of the lamp tube 1. The wiring layer 2a can be a metal layer or a power supply layer including wires such as copper wires.

In another embodiment, the outer surface of the wiring layer 2a or the dielectric layer 2b may be covered with a circuit protective layer made of an ink with function of resisting soldering and increasing reflectivity. Alternatively, the dielectric layer can be omitted and the wiring layer can be directly bonded to the inner circumferential surface of the lamp tube, and the outer surface of the wiring layer 2a may be coated with the circuit protective layer. Whether the wiring layer 2a has a one-layered, or two-layered structure, the circuit protective layer can be adopted. In some embodiments, the circuit protective layer is disposed only on one side/surface of the LED light strip 2, such as the surface having the LED light source 202. In some embodiments, the bendable circuit sheet is a one-layered structure made of just one wiring layer 2a, or a two-layered structure made of one wiring layer 2a and one dielectric layer 2b, and thus is more bendable or flexible to curl when compared with the conventional three-layered flexible substrate (one dielectric layer sandwiched with two wiring layers). As a result, the bendable circuit sheet of the LED light strip 2 can be installed in a lamp tube with a customized shape or non-tubular shape, and fitly mounted to the inner surface of the lamp tube. The bendable circuit sheet closely mounted to the inner surface of the lamp tube is preferable in some cases. In addition, using fewer layers of the bendable circuit sheet improves the heat dissipation and lowers the material cost.

Nevertheless, the bendable circuit sheet is not limited to being one-layered or two-layered; in other embodiments, the bendable circuit sheet may include multiple layers of the wiring layers 2a and multiple layers of the dielectric layers 2b, in which the dielectric layers 2b and the wiring layers 2a are sequentially stacked in a staggered manner, respectively. These stacked layers may be between the outermost wiring layer 2a (with respect to the inner circumferential surface of the lamp tube), which has the LED light source 202 disposed thereon, and the inner circumferential surface of the lamp tube, and may be electrically connected to the power supply 5. Moreover, in some embodiments, the length of the bendable circuit sheet is greater than the length of the lamp tube (not including the length of the two end caps respectively connected to two ends of the lamp tube), or at least greater than a central portion of the lamp tube between two transition regions (e.g., where the circumference of the lamp tube narrows) on either end. In one embodiment, the longitudinally projected length of the bendable circuit sheet as the LED light strip 2 is larger than the length of the lamp tube.

Figure 6:
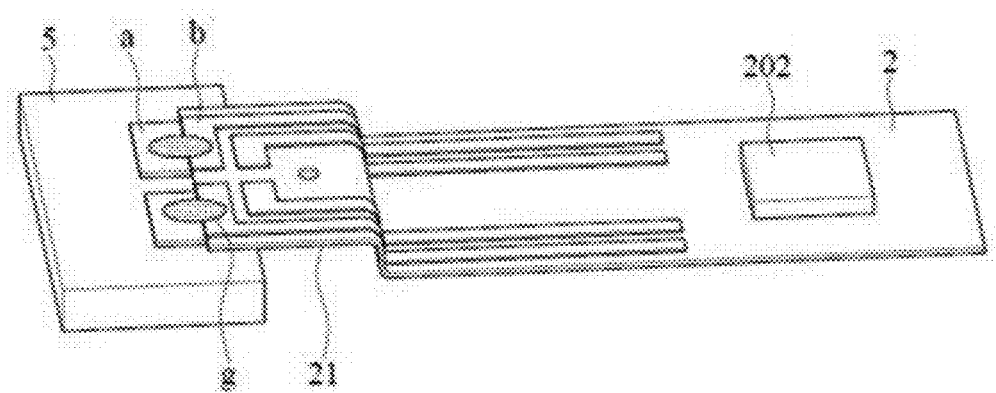
FIG. 6 is a perspective view schematically illustrating the soldering pad of a bendable circuit sheet of an LED light strip for soldering connection with a printed circuit board of a power supply of an LED tube lamp according to an exemplary embodiment.

Referring to FIG. 4, FIG. 6, and FIG. 9, in some embodiments, the LED light strip 2 is disposed inside the glass lamp tube 1 with a plurality of LED light sources 202 mounted on the LED light strip 2. The LED light strip 2 includes a bendable circuit sheet electrically connecting the LED light sources 202 with the power supply 5. The power supply 5 or power supply module may include various elements for providing power to the LED light strip 2. For example, the elements may include power converters or other circuit elements for providing power to the LED light strip 2. For example, the power supply may include a circuit that converts or generates power based on a received voltage, in order to supply power to operate an LED module and the LED light sources 202 of the LED tube lamp. A power supply, as described in connection with power supply 5, may be otherwise referred to as a power conversion module or circuit or a power module. A power conversion module or circuit, or power module, may supply or provide power from external signal(s), such as from an AC power line or from a ballast, to an LED module and the LED light sources 202.

In some embodiments, the length of the bendable circuit sheet is larger than the length of the glass lamp tube 1, and the bendable circuit sheet has a first end and a second end opposite to each other along the first direction, and at least one of the first and second ends of the bendable circuit sheet is bent away from the glass lamp tube 1 to form a freely extending end portion 21 along a longitudinal direction of the glass lamp tube 1. The freely extendable end portion 21 is an integral portion of the bendable circuit sheet 2. In some embodiments, if two power supplies 5 are adopted, then the other of the first and second ends might also be bent away from the glass lamp tube 1 to form another freely extending end portion 21 along the longitudinal direction of the glass lamp tube 1. The freely extending end portion 21 is electrically connected to the power supply 5. Specifically, in some embodiments, the power supply 5 has soldering pads "a" which are capable of being soldered with the soldering pads "b" of the freely extending end portion 21 by soldering material "g".

Referring to FIG. 9, in one embodiment, the LED light strip 2 includes a bendable circuit sheet having in sequence a first wiring layer 2a, a dielectric layer 2b, and a second wiring layer 2c. The thickness of the second wiring layer 2c (e.g., in a direction in which the layers 2a through 2c are stacked) is greater than that of the first wiring layer 2a, and the length of the LED light strip 2 is greater than that of the lamp tube 1, or at least greater than a central portion of the lamp tube between two transition regions (e.g., where the circumference of the lamp tube narrows) on either end. The end region of the light strip 2 extending beyond the end portion of the lamp tube 1 without disposition of the light source 202 (e.g., an end portion without light sources 202 disposed thereon) may be formed with two separate through holes 203 and 204 to respectively electrically communicate the first wiring layer 2a and the second wiring layer 2c. The through holes 203 and 204 are not communicated to each other to avoid short.

Furthermore, the first wiring layer 2a and the second wiring layer 2c of the end region of the LED light strip 2 that extends beyond the end portion of the lamp tube 1 without disposition of the light source 202 can be used to accomplish the circuit layout of a power supply module so that the power supply module can be directly disposed on the bendable circuit sheet of the LED light strip 2.

The power supply 5 according to some embodiments of the present invention can be formed on a single printed circuit board provided with a power supply module as depicted for example in in FIG. 4.

In still another embodiment, the connection between the power supply 5 and the LED light strip 2 may be accomplished via tin soldering, rivet bonding, or welding. One way to secure the LED light strip 2 is to provide the adhesive sheet 4 at one side thereof and adhere the LED light strip 2 to the inner surface of the lamp tube 1 via the adhesive sheet 4. Two ends of the LED light strip 2 can be either fixed to or detached from the inner surface of the lamp tube 1.

In case where two ends of the LED light strip 2 are fixed to the inner surface of the lamp tube and that the LED light strip 2 is connected to the power supply 5 via wire-bonding, any movement in subsequent transportation is likely to cause the bonded wires to break. Therefore, a useful option for the connection between the light strip 2 and the power supply 5 could be soldering. Specifically, referring to FIG. 4, the ends of the LED light strip 2 including the bendable circuit sheet are arranged to pass over the strengthened transition region and be directly solder bonded to an output terminal of the power supply 5. This may improve the product quality by avoiding using wires and/or wire bonding.

Referring to FIG. 6, an output terminal of the printed circuit board of the power supply 5 may have soldering pads "a" provided with an amount of solder (e.g., tin solder) with a thickness sufficient to later form a solder joint. Correspondingly, the ends of the LED light strip 2 may have soldering pads "b". The soldering pads "a" on the output terminal of the printed circuit board of the power supply 5 are soldered to the soldering pads "b" on the LED light strip 2 via the tin solder on the soldering pads "a". The soldering pads "a" and the soldering pads "b" may be face to face during soldering such that the connection between the LED light strip 2 and the printed circuit board of the power supply 5 is the most firm. However, this kind of soldering typically includes that a thermo-compression head presses on the rear surface of the LED light strip 2 and heats the tin solder, i.e. the LED light strip 2 intervenes between the thermo-compression head and the tin solder, and therefore may easily cause reliability problems.

Referring again to FIG. 6, two ends of the LED light strip 2 detached from the inner surface of the lamp tube 1 are formed as freely extending portions 21, while most of the LED light strip 2 is attached and secured to the inner surface of the lamp tube 1. One of the freely extending portions 21 has the soldering pads "b" as mentioned above. Upon assembling of the LED tube lamp, the freely extending end portions 21 along with the soldered connection of the printed circuit board of the power supply 5 and the LED light strip 2 would be coiled, curled up or deformed to be fittingly accommodated inside the lamp tube 1. When the bendable circuit sheet of the LED light strip 2 includes in sequence the first wiring layer 2a, the dielectric layer 2b, and the second wiring layer 2c as shown in FIG. 9, the freely extending end portions 21 can be used to accomplish the connection between the first wiring layer 2a and the second wiring layer 2c and arrange the circuit layout of the power supply 5.

In this embodiment, during the connection of the LED light strip 2 and the power supply 5, the soldering pads "b" and the soldering pads "a" and the LED light sources 202 are on surfaces facing toward the same direction and the soldering pads "b" on the LED light strip 2 are each formed with a through hole such that the soldering pads "b" and the soldering pads "a" communicate with each other via the through holes. When the freely extending end portions 21 are deformed due to contraction or curling up, the soldered connection of the printed circuit board of the power supply 5 and the LED light strip 2 exerts a lateral tension on the power supply 5. Furthermore, the soldered connection of the printed circuit board of the power supply 5 and the LED light strip 2 also exerts a downward tension on the power supply 5 when compared with the situation where the soldering pads "a" of the power supply 5 and the soldering pads "b" of the LED light strip 2 are face to face. This downward tension on the power supply 5 comes from the tin solders inside the through holes and forms a stronger and more secure electrical connection between the LED light strip 2 and the power supply 5. As described above, the freely extending portions 21 may be different from a fixed portion of the LED light strip 2 in that they fixed portion may conform to the shape of the inner surface of the lamp tube 1 and may be fixed thereto, while the freely extending portion 21 may have a shape that does not conform to the shape of the lamp tube 1. For example, there may be a space between an inner surface of the lamp tube 1 and the freely extending portion 21. As shown in FIG. 6, the freely extending portion 21 may be bent away from the lamp tube 1.

The through hole communicates the soldering pad "a" with the soldering pad "b" so that the solder (e.g., tin solder) on the soldering pads "a" passes through the through holes and finally reach the soldering pads "b". A smaller through hole would make it difficult for the tin solder to pass. The tin solder accumulates around the through holes upon exiting the through holes and condenses to form a solder ball "g" with a larger diameter than that of the through holes upon condensing. Such a solder ball "g" functions as a rivet to further increase the stability of the electrical connection between the soldering pads "a" on the power supply 5 and the soldering pads "b" on the LED light strip 2.

Figure 7:
FIG. 7 is a perspective view schematically illustrating a circuit board assembly composed of a bendable circuit sheet of an LED light strip and a printed circuit board of a power supply according to another exemplary embodiment.
Figure 8:
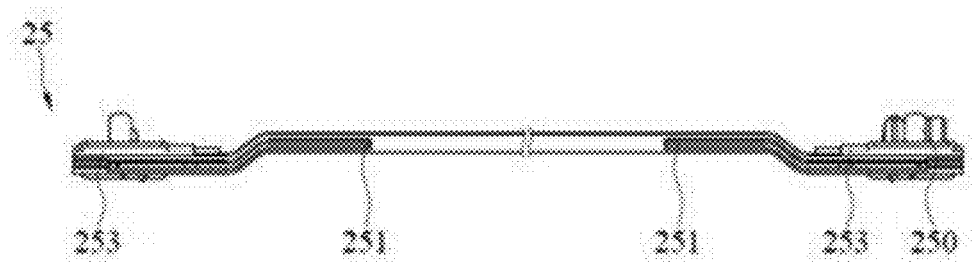
FIG. 8 is a perspective view schematically illustrating another exemplary arrangement of the circuit board assembly of FIG. 7.

Referring to FIGS. 7 and 8, in another embodiment, the LED light strip 2 and the power supply 5 may be connected by utilizing a circuit board assembly 25 instead of solder bonding. The circuit board assembly 25 has a long circuit sheet 251 and a short circuit board 253 that are adhered to each other with the short circuit board 253 being adjacent to the side edge of the long circuit sheet 251. The short circuit board 253 may be provided with power supply module 250 to form the power supply 5. The short circuit board 253 is stiffer or more rigid than the long circuit sheet 251 to be able to support the power supply module 250.

The long circuit sheet 251 may be the bendable circuit sheet of the LED light strip including a wiring layer 2a as shown in FIG. 5. The wiring layer 2a of the long circuit sheet 251 and the power supply module 250 may be electrically connected in various manners depending on the demand in practice. As shown in FIG. 7, the power supply module 250 and the long circuit sheet 251 having the wiring layer 2a on one surface are on the same side of the short circuit board 253 such that the power supply module 250 is directly connected to the long circuit sheet 251. As shown in FIG. 8, alternatively, the power supply module 250 and the long circuit sheet 251 including the wiring layer 2a on one surface are on opposite sides of the short circuit board 253 such that the power supply module 250 is directly connected to the short circuit board 253 and indirectly connected to the wiring layer 2a of the LED light strip 2 by way of the short circuit board 253.

As shown in FIG. 7, in one embodiment, the long circuit sheet 251 and the short circuit board 253 are adhered together first, and the power supply module 250 is subsequently mounted on the wiring layer 2a of the long circuit sheet 251 serving as the LED light strip 2. The long circuit sheet 251 of the LED light strip 2 herein is not limited to include only one wiring layer 2a and may further include another wiring layer such as the wiring layer 2c shown in FIG. 9. The light sources 202 are disposed on the wiring layer 2a of the LED light strip 2 and electrically connected to the power supply 5 by way of the wiring layer 2a. As shown in FIG. 8, in another embodiment, the long circuit sheet 251 of the LED light strip 2 may include a wiring layer 2a and a dielectric layer 2b. The dielectric layer 2b may be adhered to the short circuit board 253 first and the wiring layer 2a is subsequently adhered to the dielectric layer 2b and extends to the short circuit board 253. All these embodiments are within the scope of applying the circuit board assembly concept of the present invention.

In the above-mentioned embodiments, the short circuit board 253 may have a length generally of about 15 mm to about 40 mm and in some preferable embodiments about 19 mm to about 36 mm, while the long circuit sheet 251 may have a length generally of about 800 mm to about 2800 mm and in some embodiments of about 1200 mm to about 2400 mm. A ratio of the length of the short circuit board 253 to the length of the long circuit sheet 251 ranges from, for example, about 1:20 to about 1:200.

When the ends of the LED light strip 2 are not fixed on the inner surface of the lamp tube 1, the connection between the LED light strip 2 and the power supply 5 via soldering bonding would likely not firmly support the power supply 5, and it may be necessary to dispose the power supply 5 inside the end cap. For example, a longer end cap to have enough space for receiving the power supply 5 may be used. However, this will reduce the length of the lamp tube under the prerequisite that the total length of the LED tube lamp is fixed according to the product standard, and may therefore decrease the effective illuminating areas.

Figure 10:
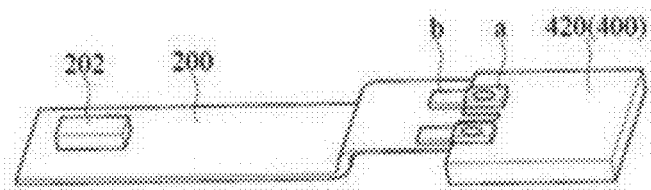
FIG. 10 is a perspective view of an exemplary bendable circuit sheet and a printed circuit board of a power supply soldered to each other, according to certain embodiments.

Referring to FIG. 10, FIG. 10 is a perspective view of a bendable circuit sheet 200 and a printed circuit board 420 of a power supply 400 soldered to each other. In the embodiment, the bendable circuit sheet 200 and the freely extending end portion 21 have the same structure. The freely extending end portion 21 comprises the portions of two opposite ends of the bendable circuit sheet 200 and is utilized for being connected to the printed circuit board 420. The bendable circuit sheet 200 and the power supply 400 are electrically connected to each other by soldering.

Next, examples of the circuit design and using of the power supply module 250 are described as follows.

Figure 11A:
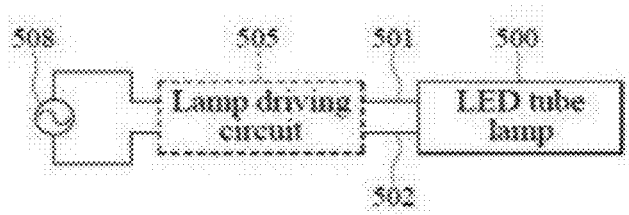
FIG. 11A is a block diagram of an exemplary power supply system for an LED tube lamp according to some embodiments.

FIG. 11A is a block diagram of a power supply system for an LED tube lamp according to an embodiment.

Referring to FIG. 11A, an AC power supply 508 is used to supply an AC supply signal, and may be an AC powerline with a voltage rating, for example, of 100-277 volts and a frequency rating, for example, of 50 or 60 Hz. A lamp driving circuit 505 receives and then converts the AC supply signal into an AC driving signal as an external driving signal (external, in that it is external to the LED tube lamp). Lamp driving circuit 505 may be for example an electronic ballast used to convert the AC powerline into a high-frequency high-voltage AC driving signal. Common types of electronic ballast include instant-start ballast, programmed-start or rapid-start ballast, etc., which may all be applicable to the LED tube lamp of the present disclosure. The voltage of the AC driving signal is in some embodiments higher than 300 volts, and is in some embodiments in the range of about 400-700 volts. The frequency of the AC driving signal is in some embodiments higher than 10 k Hz, and is in some embodiments in the range of about 20 k-50 k Hz. The LED tube lamp 500 receives an external driving signal and is thus driven to emit light via the LED light sources 202. In one embodiment, the external driving signal comprises the AC driving signal from lamp driving circuit 505. In one embodiment, LED tube lamp 500 is in a driving environment in which it is power-supplied at only one end cap having two conductive pins 501 and 502, which are coupled to lamp driving circuit 505 to receive the AC driving signal. The two conductive pins 501 and 502 may be electrically and physically connected to, either directly or indirectly, the lamp driving circuit 505. The two conductive pins 501 and 502 may be formed, for example, of a conductive material such as a metal. The conductive pins may have, for example, a protruding rod-shape, or a ball shape. Conductive pins such as 501 and 502 may be generally referred to as external connection terminals, for connecting the LED tube lamp 500 to an external socket. Under such circumstance, conductive pin 501 can be referred to as the first external connection terminal, and conductive pin 502 can be referred to as the second external connection terminal. The external connection terminals may have an elongated shape, a ball shape, or in some cases may even be flat or may have a female-type connection for connecting to protruding male connectors in a lamp socket. In another embodiment, the numbers of the conductive pins may more than two. For example, the numbers of the conductive pins can vary depending on the needs of the application.

In some embodiments, lamp driving circuit 505 may be omitted and is therefore depicted by a dotted line. In one embodiment, if lamp driving circuit 505 is omitted, AC power supply 508 is directly connected to pins 501 and 502, which then receive the AC supply signal as an external driving signal.

Figure 11B:
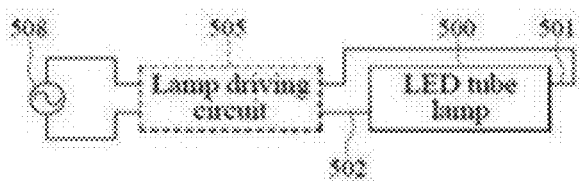
FIG. 11B is a block diagram of an exemplary power supply system for an LED tube lamp according to some embodiments.

In addition to the above use with a single-end power supply, LED tube lamp 500 may instead be used with a dual-end power supply to one pin at each of the two ends of an LED lamp tube. FIG. 11B is a block diagram of a power supply system for an LED tube lamp according to one embodiment. Referring to FIG. 11B, compared to that shown in FIG. 11A, pins 501 and 502 are respectively disposed at the two opposite end caps of LED tube lamp 500, forming a single pin at each end of LED tube lamp 500, with other components and their functions being the same as those in FIG. 11A.

Figure 11C:
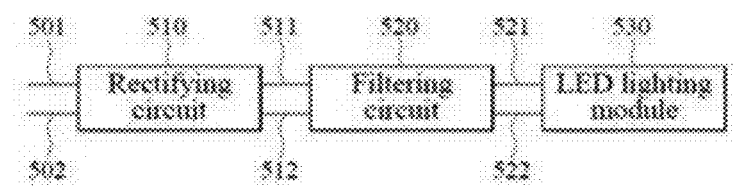
FIG. 11C is a block diagram showing elements of an exemplary LED lamp according to some embodiments.

FIG. 11C is a block diagram showing elements of an LED lamp according to an exemplary embodiment. Referring to FIG. 11C, the power supply module 250 of the LED lamp may include a rectifying circuit 510 and a filtering circuit 520, and may also include some components of an LED lighting module 530. Rectifying circuit 510 is coupled to pins 501 and 502 to receive and then rectify an external driving signal, so as to output a rectified signal at output terminals 511 and 512. The external driving signal may be the AC driving signal or the AC supply signal described with reference to FIGS. 11A and 11B, or may even be a DC signal, which in some embodiments does not alter the LED lamp of the present invention. Filtering circuit 520 is coupled to the first rectifying circuit for filtering the rectified signal to produce a filtered signal. For instance, filtering circuit 520 is coupled to terminals 511 and 512 to receive and then filter the rectified signal, so as to output a filtered signal at output terminals 521 and 522. LED lighting module 530 is coupled to filtering circuit 520, to receive the filtered signal for emitting light. For instance, LED lighting module 530 may include a circuit coupled to terminals 521 and 522 to receive the filtered signal and thereby to drive an LED unit (e.g., LED light sources 202 on an LED light strip 2, as discussed above, and not shown in FIG. 11C). For example, as described in more detail below, LED lighting module 530 may include a driving circuit coupled to an LED module to emit light. Details of these operations are described in below descriptions of certain embodiments.

In some embodiments, although there are two output terminals 511 and 512 and two output terminals 521 and 522 in embodiments of these Figs., in practice the number of ports or terminals for coupling between rectifying circuit 510, filtering circuit 520, and LED lighting module 530 may be one or more depending on the needs of signal transmission between the circuits or devices.

In addition, the power supply module of the LED lamp described in FIG. 11C, and embodiments of the power supply module of an LED lamp described below, may each be used in the LED tube lamp 500 in FIGS. 11A and 11B, and may instead be used in any other type of LED lighting structure having two conductive pins used to conduct power, such as LED light bulbs, personal area lights (PAL), plug-in LED lamps with different types of bases (such as types of PL-S, PL-D, PL-T, PL-L, etc.), etc.

Figure 11D:
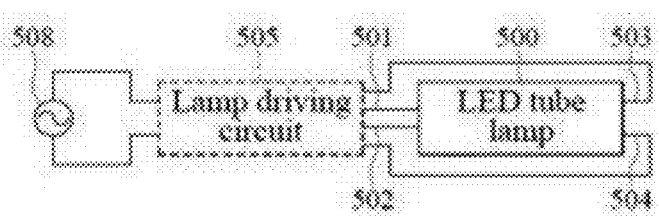
FIG. 11D is a block diagram of an exemplary power supply system for an LED tube lamp according to some embodiments.

FIG. 11D is a block diagram of a power supply system for an LED tube lamp according to an embodiment. Referring to FIG. 11D, an AC power supply 508 is used to supply an AC supply signal. A lamp driving circuit 505 receives and then converts the AC supply signal into an AC driving signal. An LED tube lamp 500 receives an AC driving signal from lamp driving circuit 505 and is thus driven to emit light. In this embodiment, LED tube lamp 500 is power-supplied at its both end caps respectively having two pins 501 and 502 and two pins 503 and 504, which are coupled to lamp driving circuit 505 to concurrently receive the AC driving signal to drive an LED unit (not shown) in LED tube lamp 500 to emit light. AC power supply 508 may be, e.g., the AC powerline, and lamp driving circuit 505 may be a stabilizer or an electronic ballast. It should be noted that different pins or external connection terminals described throughout this specification may be named as first pin/external connection terminal, second pin/external connection terminal, third pin/external connection terminal, etc., for discussion purposes. Therefore, in some situations, for example, external connection terminal 501 may be referred to as a first external connection terminal, and external connection terminal 503 may be referred to as a second external connection terminal. Also, the lamp tube may include two end caps respectively coupled to two ends thereof, and the pins may be coupled to the end caps, such that the pins are coupled to the lamp tube.

Figure 11E:
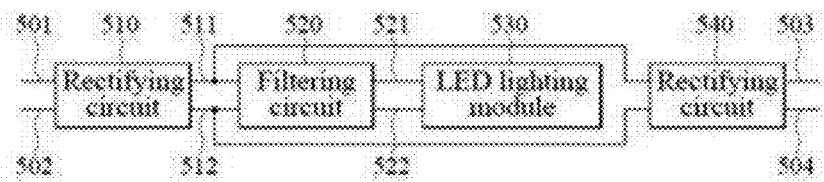
FIG. 11E is a block diagram showing elements of an LED lamp according to some embodiments.

FIG. 11E is a block diagram showing components of an LED lamp according to an exemplary embodiment. Referring to FIG. 11E, the power supply module of the LED lamp includes a rectifying circuit 510, a filtering circuit 520, and a rectifying circuit 540, and may also include some components of an LED lighting module 530. Rectifying circuit 510 is coupled to pins 501 and 502 to receive and then rectify an external driving signal conducted by pins 501 and 502. Rectifying circuit 540 is coupled to pins 503 and 504 to receive and then rectify an external driving signal conducted by pins 503 and 504. Therefore, the power supply module of the LED lamp may include two rectifying circuits 510 and 540 configured to output a rectified signal at output terminals 511 and 512. Filtering circuit 520 is coupled to terminals 511 and 512 to receive and then filter the rectified signal, so as to output a filtered signal at output terminals 521 and 522. LED lighting module 530 is coupled to terminals 521 and 522 to receive the filtered signal and thereby to drive an LED unit (not shown) of LED lighting module 530 to emit light.

The power supply module of the LED lamp in this embodiment of FIG. 11E may be used in LED tube lamp 500 with a dual-end power supply in FIG. 11D. In some embodiments, since the power supply module of the LED lamp comprises rectifying circuits 510 and 540, the power supply module of the LED lamp may be used in LED tube lamps 500 with a single-end power supply in FIGS. 11A and 11B, to receive an external driving signal (such as the AC supply signal or the AC driving signal described above). The power supply module of an LED lamp in this embodiment and other embodiments herein may also be used with a DC driving signal.

Figure 12A:
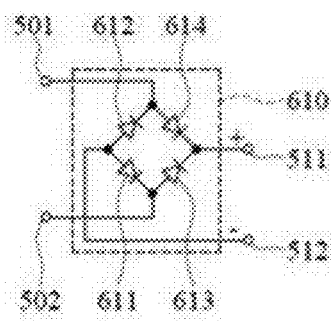
FIG. 12A is a schematic diagram of a rectifying circuit according to some exemplary embodiments.

FIG. 12A is a schematic diagram of a rectifying circuit according to an exemplary embodiment. Referring to FIG. 12A, rectifying circuit 610 includes rectifying diodes 611, 612, 613, and 614, configured to full-wave rectify a received signal. Diode 611 has an anode connected to output terminal 512, and a cathode connected to pin 502. Diode 612 has an anode connected to output terminal 512, and a cathode connected to pin 501. Diode 613 has an anode connected to pin 502, and a cathode connected to output terminal 511. Diode 614 has an anode connected to pin 501, and a cathode connected to output terminal 511.

When pins 501 and 502 (generally referred to as terminals) receive an AC signal, rectifying circuit 610 operates as follows. During the connected AC signal's positive half cycle, the AC signal is input through pin 501, diode 614, and output terminal 511 in sequence, and later output through output terminal 512, diode 611, and pin 502 in sequence. During the connected AC signal's negative half cycle, the AC signal is input through pin 502, diode 613, and output terminal 511 in sequence, and later output through output terminal 512, diode 612, and pin 501 in sequence. Therefore, during the connected AC signal's full cycle, the positive pole of the rectified signal produced by rectifying circuit 610 remains at output terminal 511, and the negative pole of the rectified signal remains at output terminal 512. Accordingly, the rectified signal produced or output by rectifying circuit 610 is a full-wave rectified signal.

When pins 501 and 502 are coupled to a DC power supply to receive a DC signal, rectifying circuit 610 operates as follows. When pin 501 is coupled to the anode of the DC supply and pin 502 to the cathode of the DC supply, the DC signal is input through pin 501, diode 614, and output terminal 511 in sequence, and later output through output terminal 512, diode 611, and pin 502 in sequence. When pin 501 is coupled to the cathode of the DC supply and pin 502 to the anode of the DC supply, the DC signal is input through pin 502, diode 613, and output terminal 511 in sequence, and later output through output terminal 512, diode 612, and pin 501 in sequence. Therefore, no matter what the electrical polarity of the DC signal is between pins 501 and 502, the positive pole of the rectified signal produced by rectifying circuit 610 remains at output terminal 511, and the negative pole of the rectified signal remains at output terminal 512.

Therefore, rectifying circuit 610 in this embodiment can output or produce a proper rectified signal regardless of whether the received input signal is an AC or DC signal.

Figure 12B:
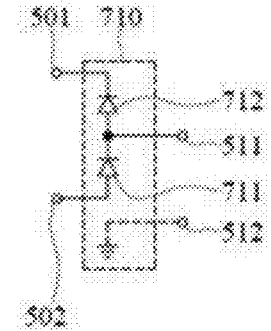
FIG. 12B is a schematic diagram of a rectifying circuit according to some exemplary embodiments.

FIG. 12B is a schematic diagram of a rectifying circuit according to an exemplary embodiment. Referring to FIG. 12B, rectifying circuit 710 includes rectifying diodes 711 and 712, configured to half-wave rectify a received signal. Diode 711 has an anode connected to pin 502, and a cathode connected to output terminal 511. Diode 712 has an anode connected to output terminal 511, and a cathode connected to pin 501. Output terminal 512 may be omitted or grounded depending on actual applications.

Next, exemplary operation(s) of rectifying circuit 710 is described as follows.

In one embodiment, during a received AC signal's positive half cycle, the electrical potential at pin 501 is higher than that at pin 502, so diodes 711 and 712 are both in a cutoff state as being reverse-biased, making rectifying circuit 710 not outputting a rectified signal. During a received AC signal's negative half cycle, the electrical potential at pin 501 is lower than that at pin 502, so diodes 711 and 712 are both in a conducting state as being forward-biased, allowing the AC signal to be input through diode 711 and output terminal 511, and later output through output terminal 512, a ground terminal, or another end of the LED tube lamp not directly connected to rectifying circuit 710. Accordingly, the rectified signal produced or output by rectifying circuit 710 is a half-wave rectified signal.

Figure 12C:
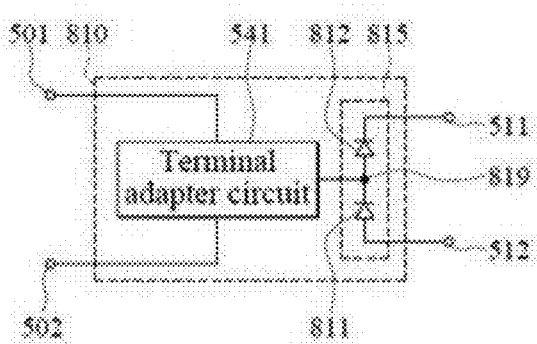
FIG. 12C is a schematic diagram of a rectifying circuit according to some exemplary embodiments.

FIG. 12C is a schematic diagram of a rectifying circuit according to an exemplary embodiment. Referring to FIG. 12C, rectifying circuit 810 includes a rectifying unit 815 and a terminal adapter circuit 541. In this embodiment, rectifying unit 815 comprises a half-wave rectifier circuit including diodes 811 and 812 and configured to half-wave rectify. Diode 811 has an anode connected to an output terminal 512, and a cathode connected to a half-wave node 819. Diode 812 has an anode connected to half-wave node 819, and a cathode connected to an output terminal 511. Terminal adapter circuit 541 is coupled to half-wave node 819 and pins 501 and 502, to transmit a signal received at pin 501 and/or pin 502 to half-wave node 819. By means of the terminal adapting function of terminal adapter circuit 541, rectifying circuit 810 includes two input terminals (connected to pins 501 and 502) and two output terminals 511 and 512.

Next, in certain embodiments, rectifying circuit 810 operates as follows.

During a received AC signal's positive half cycle, the AC signal may be input through pin 501 or 502, terminal adapter circuit 541, half-wave node 819, diode 812, and output terminal 511 in sequence, and later output through another end or circuit of the LED tube lamp. During a received AC signal's negative half cycle, the AC signal may be input through another end or circuit of the LED tube lamp, and later output through output terminal 512, diode 811, half-wave node 819, terminal adapter circuit 541, and pin 501 or 502 in sequence.

Terminal adapter circuit 541 may comprise a resistor, a capacitor, an inductor, or any combination thereof, for performing functions of voltage/current regulation or limiting, types of protection, current/voltage regulation, etc. Descriptions of these functions are presented below.

Figure 12D:
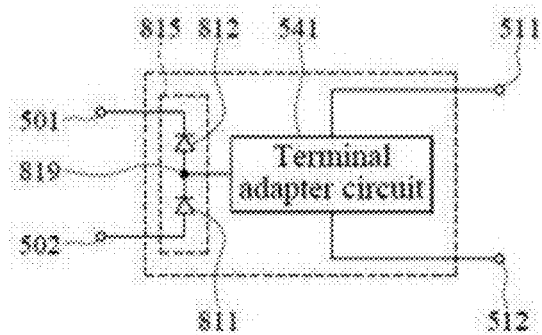
FIG. 12D is a schematic diagram of a rectifying circuit according to some exemplary embodiments.

In practice, rectifying unit 815 and terminal adapter circuit 541 may be interchanged in position (as shown in FIG. 12D), without altering the function of half-wave rectification. FIG. 12D is a schematic diagram of a rectifying circuit according to an embodiment. Referring to FIG. 12D, diode 811 has an anode connected to pin 502 and diode 812 has a cathode connected to pin 501. A cathode of diode 811 and an anode of diode 812 are connected to half-wave node 819. Terminal adapter circuit 541 is coupled to half-wave node 819 and output terminals 511 and 512. During a received AC signal's positive half cycle, the AC signal may be input through another end or circuit of the LED tube lamp, and later output through output terminal 511 or 512, terminal adapter circuit 541, half-wave node 819, diode 812, and pin 501 in sequence. During a received AC signal's negative half cycle, the AC signal may be input through pin 502, diode 811, half-wave node 819, terminal adapter circuit 541, and output node 511 or 512 in sequence, and later output through another end or circuit of the LED tube lamp.

Terminal adapter circuit 541 in embodiments shown in FIGS. 12C and 12D may be omitted and is therefore depicted by a dotted line. If terminal adapter circuit 541 of FIG. 12C is omitted, pins 501 and 502 will be coupled to half-wave node 819. If terminal adapter circuit 541 of FIG. 12D is omitted, output terminals 511 and 512 will be coupled to half-wave node 819.

Rectifying circuit 510 as shown and explained in FIGS. 12A-D can constitute or be the rectifying circuit 540 shown in FIG. 11E, as having pins 503 and 504 for conducting instead of pins 501 and 502.

Next, an explanation follows as to choosing embodiments and their combinations of rectifying circuits 510 and 540, with reference to FIGS. 11C and 11E.

Rectifying circuit 510 in embodiments shown in FIG. 11C may comprise, for example, the rectifying circuit 610 in FIG. 12A.

Rectifying circuits 510 and 540 in embodiments shown in FIG. 11E may each comprise, for example, any one of the rectifying circuits in FIGS. 12A-D, and terminal adapter circuit 541 in FIGS. 12C-D may be omitted without altering the rectification function used in an LED tube lamp. When rectifying circuits 510 and 540 each comprise a half-wave rectifier circuit described in FIGS. 12B-D, during a received AC signal's positive or negative half cycle, the AC signal may be input from one of rectifying circuits 510 and 540, and later output from the other rectifying circuit 510 or 540. Further, when rectifying circuits 510 and 540 each comprise the rectifying circuit described in FIG. 12C or 12D, or when they comprise the rectifying circuits in FIGS. 12C and 12D respectively, only one terminal adapter circuit 541 may be needed for functions of voltage/current regulation or limiting, types of protection, current/voltage regulation, etc. within rectifying circuits 510 and 540, omitting another terminal adapter circuit 541 within rectifying circuit 510 or 540.

Figure 13A:
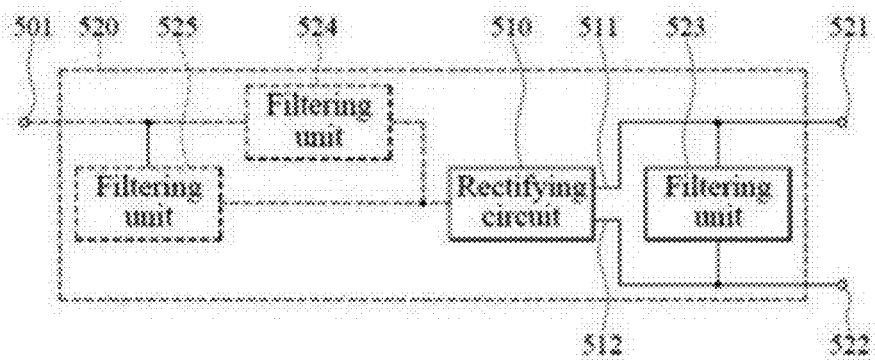
FIG. 13A is a block diagram of a filtering circuit according to some exemplary embodiments.

FIG. 13A is a block diagram of a filtering circuit according to an exemplary embodiment. Rectifying circuit 510 is shown in FIG. 13A for illustrating its connection with other components, without intending filtering circuit 520 to include rectifying circuit 510. Referring to FIG. 13A, filtering circuit 520 includes a filtering unit 523 coupled to rectifying output terminals 511 and 512 to receive, and to filter out ripples of a rectified signal from rectifying circuit 510, thereby outputting a filtered signal whose waveform is smoother than the rectified signal. Filtering circuit 520 may further comprise another filtering unit 524 coupled between a rectifying circuit and a pin, which are for example rectifying circuit 510 and pin 501, rectifying circuit 510 and pin 502, rectifying circuit 540 and pin 503, or rectifying circuit 540 and pin 504. Filtering unit 524 is for filtering of a specific frequency, in order to filter out a specific frequency component of an external driving signal. In this embodiment of FIG. 13A, filtering unit 524 is coupled between rectifying circuit 510 and pin 501. Filtering circuit 520 may further comprise another filtering unit 525 coupled between one of pins 501 and 502 and a diode of rectifying circuit 510, or between one of pins 503 and 504 and a diode of rectifying circuit 540, for reducing or filtering out electromagnetic interference (EMI). In this embodiment, filtering unit 525 is coupled between pin 501 and a diode (not shown in FIG. 13A) of rectifying circuit 510. Since filtering units 524 and 525 may be present or omitted depending on actual circumstances of their uses, they are depicted by a dotted line in FIG. 13A. Filtering units 523, 524, and 525 may be referred to herein as filtering sub-circuits of filtering circuit 520, or may be generally referred to as a filtering circuit.

Figure 13B:
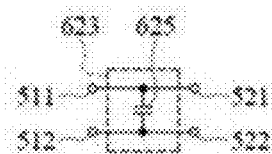
FIG. 13B is a schematic diagram of a filtering unit according to some exemplary embodiments.

FIG. 13B is a schematic diagram of a filtering unit according to an exemplary embodiment. Referring to FIG. 13B, filtering unit 623 includes a capacitor 625 having an end coupled to output terminal 511 and a filtering output terminal 521 and another end coupled to output terminal 512 and a filtering output terminal 522, and is configured to low-pass filter a rectified signal from output terminals 511 and 512, so as to filter out high-frequency components of the rectified signal and thereby output a filtered signal at output terminals 521 and 522.

Figure 13C:
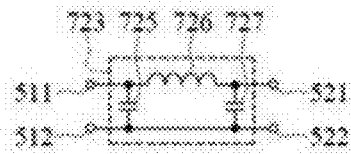
FIG. 13C is a schematic diagram of a filtering unit according to some exemplary embodiments.

FIG. 13C is a schematic diagram of a filtering unit according to an exemplary embodiment. Referring to FIG. 13C, filtering unit 723 comprises a pi filter circuit including a capacitor 725, an inductor 726, and a capacitor 727. As is well known, a pi filter circuit looks like the symbol 7C in its shape or structure. Capacitor 725 has an end connected to output terminal 511 and coupled to output terminal 521 through inductor 726, and has another end connected to output terminals 512 and 522. Inductor 726 is coupled between output terminals 511 and 521. Capacitor 727 has an end connected to output terminal 521 and coupled to output terminal 511 through inductor 726, and has another end connected to output terminals 512 and 522.

As seen between output terminals 511 and 512 and output terminals 521 and 522, filtering unit 723 compared to filtering unit 623 in FIG. 13B additionally has inductor 726 and capacitor 727, which are like capacitor 725 in performing low-pass filtering. Therefore, filtering unit 723 in this embodiment compared to filtering unit 623 in FIG. 13B has a better ability to filter out high-frequency components to output a filtered signal with a smoother waveform.

Inductance values of inductor 726 in the embodiment described above are chosen in some embodiments in the range of about 10 nH to about 10 mH. And capacitance values of capacitors 625, 725, and 727 in the embodiments described above are chosen in some embodiments in the range, for example, of about 100 pF to about 1 uF.

Figure 14A:
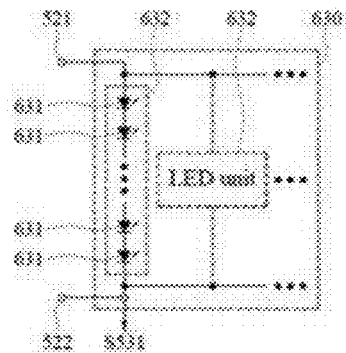
FIG. 14A is a schematic diagram of an LED module according to some exemplary embodiments.

FIG. 14A is a schematic diagram of an LED module according to an exemplary embodiment. Referring to FIG. 14A, LED module 630 has an anode connected to the filtering output terminal 521, has a cathode connected to the filtering output terminal 522, and comprises at least one LED unit 632. When two or more LED units are included, they are connected in parallel. An anode of each LED unit 632 forms the anode of LED module 630 and is connected to output terminal 521, and a cathode of each LED unit 632 forms the cathode of LED module 630 and is connected to output terminal 522. Each LED unit 632 includes at least one LED 631. When multiple LEDs 631 are included in an LED unit 632, they are connected in series, with the anode of the first LED 631 forming the anode of the LED unit 632 that it is a part of, and the cathode of the first LED 631 connected to the next or second LED 631. And the anode of the last LED 631 in this LED unit 632 is connected to the cathode of a previous LED 631, with the cathode of the last LED 631 forming the cathode of the LED unit 632 that it is a part of.

In some embodiments, the LED module 630 may produce a current detection signal S531 reflecting a magnitude of current through LED module 630 and used for controlling or detecting current on the LED module 630. As described herein, an LED unit may refer to a single string of LEDs arranged in series, and an LED module may refer to a single LED unit, or a plurality of LED units connected to a same two nodes (e.g., arranged in parallel). For example, the LED light strip 2 described above may be an LED module and/or LED unit.

Figure 14B:
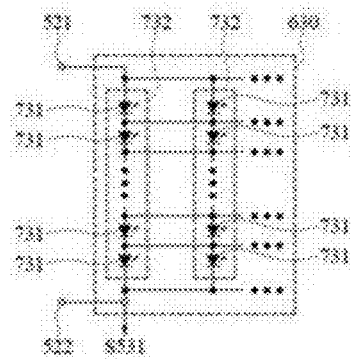
FIG. 14B is a schematic diagram of an LED module according to some exemplary embodiments.

FIG. 14B is a schematic diagram of an LED module according to an exemplary embodiment. Referring to FIG. 14B, LED module 630 has an anode connected to the filtering output terminal 521, has a cathode connected to the filtering output terminal 522, and comprises at least two LED units 732, with an anode of each LED unit 732 forming the anode of LED module 630, and a cathode of each LED unit 732 forming the cathode of LED module 630. Each LED unit 732 includes at least two LEDs 731 connected in the same way as described in FIG. 14A. For example, the anode of the first LED 731 in an LED unit 732 forms the anode of the LED unit 732 that it is a part of, the cathode of the first LED 731 is connected to the anode of the next or second LED 731, and the cathode of the last LED 731 forms the cathode of the LED unit 732 that it is a part of. Further, LED units 732 in an LED module 630 are connected to each other in this embodiment. All of the n-th LEDs 731 respectively of the LED units 732 are connected by every anode of every n-th LED 731 in the LED units 732, and by every cathode of every n-th LED 731, where n is a positive integer. In this way, the LEDs in LED module 630 in this embodiment are connected in the form of a mesh.

In some embodiments, LED lighting module 530 of the above embodiments includes LED module 630, but doesn't include a driving circuit for the LED module 630 (e.g., does not include an LED driving unit for the LED module or LED unit).

Similarly, LED module 630 in this embodiment may produce a current detection signal S531 reflecting a magnitude of current through LED module 630 and used for controlling or detecting current on the LED module 630.

Figure 15:
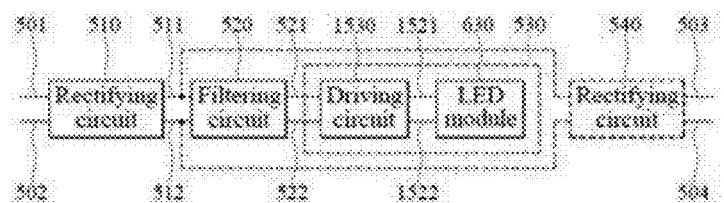
FIG. 15 is a block diagram of an LED lamp according to some exemplary embodiments.

FIG. 15 is a block diagram showing components of an LED lamp (e.g., an LED tube lamp) according to an exemplary embodiment. As shown in FIG. 15, the power supply module of the LED lamp includes rectifying circuits 510 and 540, a filtering circuit 520, and an LED driving circuit 1530, wherein an LED lighting module 530 includes the driving circuit 1530 and an LED module 630. According to the above description in FIG. 11E, driving circuit 1530 in FIG. 15 comprises a DC-to-DC converter circuit, and is coupled to filtering output terminals 521 and 522 to receive a filtered signal and then perform power conversion for converting the filtered signal into a driving signal at driving output terminals 1521 and 1522. The LED module 630 is coupled to driving output terminals 1521 and 1522 to receive the driving signal for emitting light. In some embodiments, the current of LED module 630 is stabilized at an objective current value. Exemplary descriptions of this LED module 630 are the same as those provided above with reference to FIGS. 14A-14B.

In some embodiments, the rectifying circuit 540 is an optional element and therefore can be omitted, so it is depicted in a dotted line in FIG. 15. Therefore, the power supply module of the LED lamp in this embodiment can be used with a single-end power supply coupled to one end of the LED lamp, and can be used with a dual-end power supply coupled to two ends of the LED lamp. With a single-end power supply, examples of the LED lamp include an LED light bulb, a personal area light (PAL), etc.

Figure 16A:
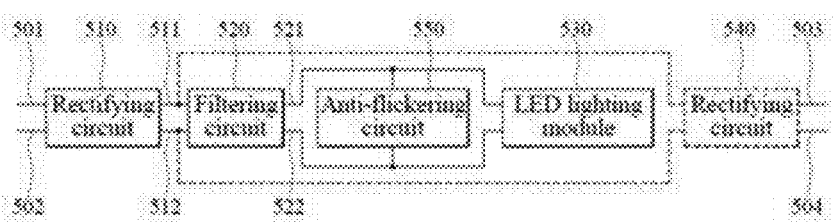
FIG. 16A is a block diagram of an LED lamp according to some exemplary embodiments.

FIG. 16A is a block diagram of an LED lamp according to an exemplary embodiment. Compared to FIG. 15, the embodiment of FIG. 16A includes rectifying circuits 510 and 540, and a filtering circuit 520, and further includes an anti-flickering circuit 550; wherein the power supply module may also include some components of an LED lighting module 530. The anti-flickering circuit 550 is coupled between filtering circuit 520 and LED lighting module 530. It's noted that rectifying circuit 540 may be omitted, as is depicted by the dotted line in FIG. 16A.

Anti-flickering circuit 550 is coupled to filtering output terminals 521 and 522, to receive a filtered signal, and under specific circumstances to consume partial energy of the filtered signal so as to reduce (the incidence of) ripples of the filtered signal disrupting or interrupting the light emission of the LED lighting module 530. In general, filtering circuit 520 has such filtering components as resistor(s) and/or inductor(s), and/or parasitic capacitors and inductors, which may form resonant circuits. Upon breakoff or stop of an AC power signal, as when the power supply of the LED lamp is turned off by a user, the amplitude(s) of resonant signals in the resonant circuits will decrease with time. But LEDs in the LED module of the LED lamp are unidirectional conduction devices and require a minimum conduction voltage for the LED module. When a resonant signal's trough value is lower than the minimum conduction voltage of the LED module, but its peak value is still higher than the minimum conduction voltage, the flickering phenomenon will occur in light emission of the LED module. In this case anti-flickering circuit 550 works by allowing a current matching a defined flickering current value of the LED component to flow through, consuming partial energy of the filtered signal which should be higher than the energy difference of the resonant signal between its peak and trough values, so as to reduce the flickering phenomenon. In certain embodiments, the anti-flickering circuit 550 may operate when the filtered signal's voltage approaches (and is still higher than) the minimum conduction voltage.

In some embodiments, the anti-flickering circuit 550 may be more suitable for the situation in which LED lighting module 530 doesn't include driving circuit 1530, for example, when LED module 630 of LED lighting module 530 is (directly) driven to emit light by a filtered signal from a filtering circuit. In this case, the light emission of LED module 630 will directly reflect variation in the filtered signal due to its ripples. In this situation, the introduction of anti-flickering circuit 550 will prevent the flickering phenomenon from occurring in the LED lamp upon the breakoff of power supply to the LED lamp.

Figure 16B:
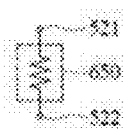
FIG. 16B is a schematic diagram of an anti-flickering circuit according to some exemplary embodiments.

FIG. 16B is a schematic diagram of the anti-flickering circuit according to an exemplary embodiment. Referring to FIG. 16B, anti-flickering circuit 650 includes at least a resistor, such as two resistors connected in series between filtering output terminals 521 and 522. In this embodiment, anti-flickering circuit 650 in use consumes partial energy of a filtered signal continually. When in normal operation of the LED lamp, this partial energy is far lower than the energy consumed by LED lighting module 530. But upon a breakoff or stop of the power supply, when the voltage level of the filtered signal decreases to approach the minimum conduction voltage of LED module 630, this partial energy is still consumed by anti-flickering circuit 650 in order to offset the impact of the resonant signals which may cause the flickering of light emission of LED module 630. In some embodiments, a current equal to or larger than an anti-flickering current level may be set to flow through anti-flickering circuit 650 when LED module 630 is supplied by the minimum conduction voltage, and then an equivalent anti-flickering resistance of anti-flickering circuit 650 can be determined based on the set current.

Figure 17A:
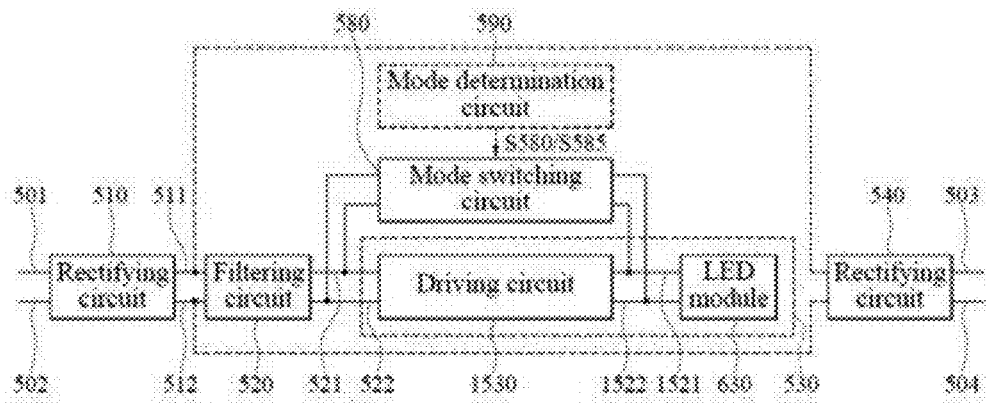
FIG. 17A is a block diagram of an LED lamp according to some exemplary embodiments.

FIG. 17A is a block diagram of an LED lamp according to an exemplary embodiment. Compared to FIG. 15, the embodiment of FIG. 17A includes rectifying circuits 510 and 540, a filtering circuit 520, and a driving circuit 1530, and further includes a mode switching circuit 580; wherein an LED lighting module 530 is composed of driving circuit 1530 and an LED module 630. Mode switching circuit 580 is coupled to at least one of filtering output terminals 521 and 522 and at least one of driving output terminals 1521 and 1522, for determining whether to perform a first driving mode or a second driving mode, as according to a frequency of the external driving signal. In the first driving mode, a filtered signal from filtering circuit 520 is input into driving circuit 1530, while in the second driving mode the filtered signal bypasses at least a component of driving circuit 1530, making driving circuit 1530 stop working in conducting the filtered signal, allowing the filtered signal to (directly) reach and drive LED module 630. The bypassed component(s) of driving circuit 1530 may include an inductor or a switch, which when bypassed makes driving circuit 1530 unable to transfer and/or convert power, and then stop working in conducting the filtered signal. If driving circuit 1530 includes a capacitor, the capacitor can still be used to filter out ripples of the filtered signal in order to stabilize the voltage across the LED module. When mode switching circuit 580 determines to perform the first driving mode, allowing the filtered signal to be input to driving circuit 1530, driving circuit 1530 then transforms the filtered signal into a driving signal for driving LED module 630 to emit light. On the other hand, when mode switching circuit 580 determines to perform the second driving mode, allowing the filtered signal to bypass driving circuit 1530 to reach LED module 630, filtering circuit 520 then becomes in effect a driving circuit for LED module 630. Then filtering circuit 520 provides the filtered signal as a driving signal for the LED module for driving the LED module to emit light.

In some embodiments, the mode switching circuit 580 can determine whether to perform the first driving mode or the second driving mode based on a user's instruction or a detected signal received by the LED lamp through pins 501, 502, 503, and 504. In some embodiments, a mode determination circuit 590 is used to determine the first driving mode or the second driving mode based on a signal received by the LED lamp and so the mode switching circuit 580 can determine whether to perform the first driving mode or the second driving mode based on a determined result signal S580 or/and S585. With the mode switching circuit, the power supply module of the LED lamp can adapt to or perform one of appropriate driving modes corresponding to different application environments or driving systems, thus improving the compatibility of the LED lamp. In some embodiments, rectifying circuit 540 may be omitted, as is depicted by the dotted line in FIG. 17A.

Figure 17B:
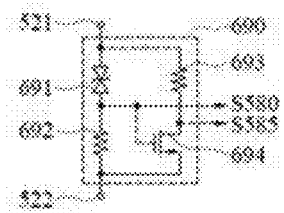
FIG. 17B is a schematic diagram of a mode determination circuit in an LED lamp according to some exemplary embodiments.

FIG. 17B is a schematic diagram of a mode determination circuit in an LED lamp according to an exemplary embodiment. Referring to FIG. 17B, the mode determination circuit 690 comprises a symmetrical trigger diode 691 and a resistor 692, configured to detect a voltage level of an external driving signal. The symmetrical trigger diode 691 and the resistor 692 are connected in series; and namely, one end of the symmetrical trigger diode 691 is coupled to the first filtering output terminal 521, the other end thereof is coupled to one end of the resistor 692, and the other end of the resistor 692 is coupled to the second filtering output terminal 522. A connection node of the symmetrical trigger diode 691 and the resistor 692 generates a determined result signal S580 transmitted to a mode switching circuit. When an external driving signal is a signal with high frequency and high voltage, the determined result signal S580 is at a high voltage level to make the mode switching circuit determine to operate at the second driving mode. For example, when the lamp driving circuit 505, as shown in FIG. 11A and FIG. 11D, exists, the lamp driving circuit 505 converts the AC power signal of the AC power supply 508 into an AC driving signal with high frequency and high voltage, transmitted into the LED tube lamp 500. At this time, the mode switching circuit determines to operate at the second driving mode and so the filtered signal, outputted by a first filtering output terminal 521 and a second filtering output terminal 522, directly drive the LED module 630 to light. When the external driving signal is a signal with low frequency and low voltage, the determined result signal S580 is at a low voltage level to make the mode switching circuit determine to operate at the first driving mode. For example, when the lamp driving circuit 505, as shown in FIG. 11A and FIG. 11D, does not exist, the AC power signal of the AC power supply 508 is directly transmitted into the LED tube lamp 500. At this time, the mode switching circuit determines to operate at the first driving mode and so the filtered signal, outputted by the first filtering output terminal 521 and the second filtering output terminal 522, is converted into an appropriate voltage level to drive the LED module 630 to light.

In some embodiments, a breakover voltage of the symmetrical trigger diode 691 is in a range of 400V-1300V, in some embodiments more specifically in a range of 450V-700V, and in some embodiments more specifically in a range of 500V-600V.

The mode determination circuit 690 may include a resistor 693 and a switch 694. The resistor 693 and the switch 694 could be omitted based on the practice application, thus the resistor 693 and the switch 694 and a connection line thereof are depicted in a dotted line in FIG. 17B. The resistor 693 and the switch 694 are connected in series; namely one end of the resistor 693 is coupled to the first filtering output terminal 521, the other end is coupled to one end of the switch 694, and another end of the switch 694 is coupled to a second filtering output terminal 522. A control end of the switch 694 is coupled to the connection node of the symmetrical trigger diode 691 and the resistor 692 for receiving the determined result signal S580. Accordingly, a connection node of the resistor 693 and the switch 694 generates another determined result signal S585. The determined result signal S585 is an inverted signal of the determined result signal S580 and so they could be applied to a mode switching circuit having switches for switching between two modes.

Figure 17C:
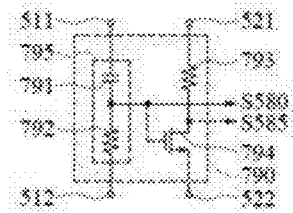
FIG. 17C is a schematic diagram of a mode determination circuit in an LED lamp according to some exemplary embodiments.
Figure 18A:
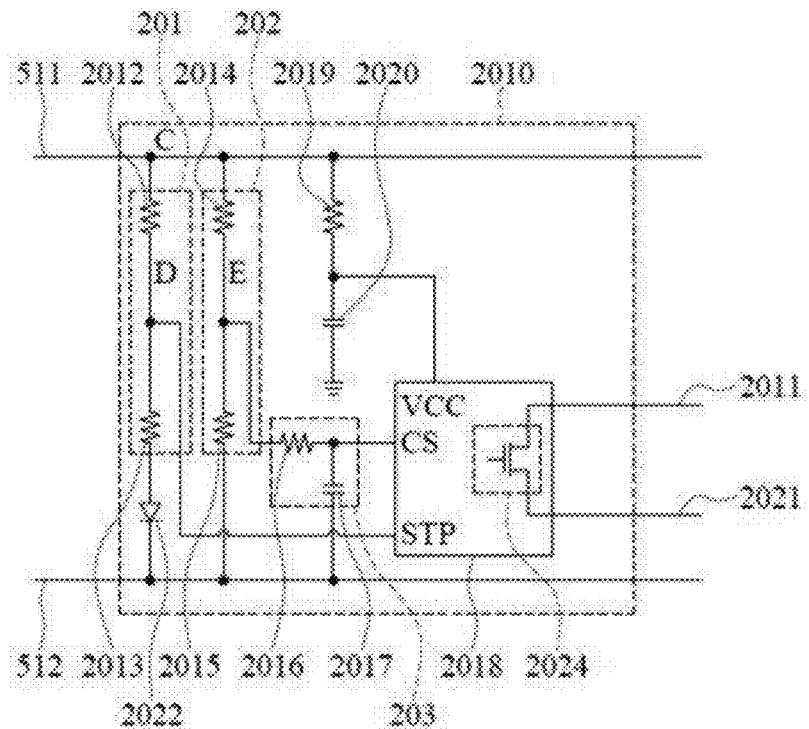
FIG. 18A is a schematic diagram of a mode determination circuit according to some exemplary embodiments.
Figure 18B:
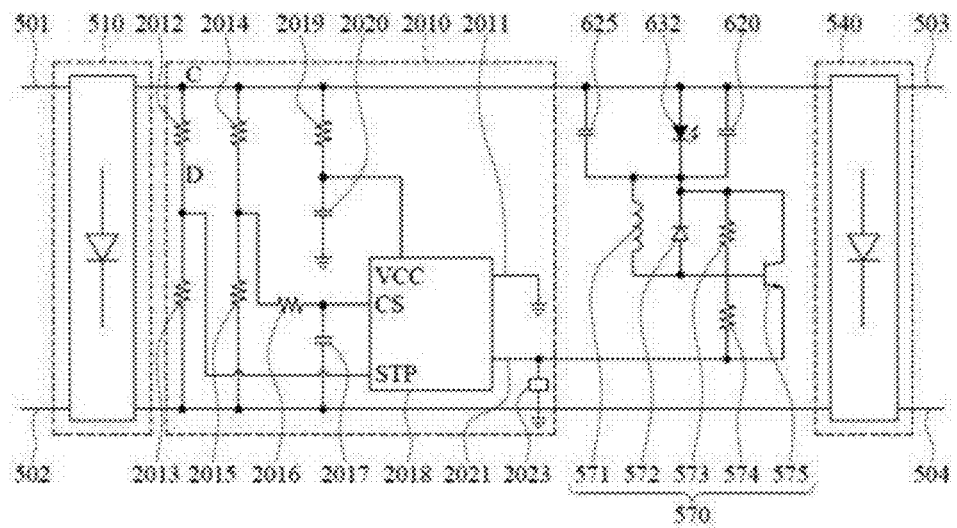
FIG. 18B is a schematic diagram of an LED tube lamp according to some exemplary embodiments, which includes an embodiment of the mode determination circuit.

FIG. 17C is a schematic diagram of a mode determination circuit in an LED lamp according to an exemplary embodiment. Referring to FIG. 17C, the mode determination circuit 790 includes a capacitor 791, resistors 792 and 793, and a switch 794. The capacitor 791 and the resistor 792 are connected in series as a frequency determination circuit 795 for detecting a frequency of an external driving signal. One end of the capacitor 792 is coupled to a first rectifying output terminal 511, the other end is coupled to one end of the resistor 791, and the other end of the resistor 791 is coupled to a second rectifying output terminal 512. The frequency determination circuit 795 generates the determined result signal S580 at a connection node of the resistor 791 and the capacitor 792. A voltage level of the determined result signal S580 is determined based on the frequency of the external driving signal. In some embodiments, the higher the frequency of the external driving signal is, the higher the voltage level of the determined result signal S580 is, and the lower the frequency of the external driving signal is, the lower the voltage level of the determined result signal S580 is. Hence, when the external driving signal is a higher frequency signal (e.g., more than 20 KHz) and high voltage, the determined result signal S580 is at high voltage level to make the mode switching circuit determine to operate at second driving mode. When the external driving signal is a lower frequency signal and low voltage signal, the determined result signal S580 is at a low voltage level to make the mode switching circuit determine to operate at first driving mode. Similarly, in some embodiments, the mode determination circuit 790 may include a resistor 793 and a switch 794. The resistor 793 and the switch 794 are connected in series between the first filtering output terminal 521 and the second filtering output terminal 522, and a control end of the switch 794 is coupled to the frequency determination circuit 795 to receive the determined result signal S580. Accordingly, another determined result signal S585 is generated at a connection node of the resistor 793 and the switch 794 and is an inverted signal of the determined result signal S580. The determined result signals S580 and S585 may be applied to a mode switching circuit having two switches. The resistor 793 and the switch 794 could be omitted based on practice application and so are depicted in a dotted line FIG. 18A is a schematic diagram of a mode determination circuit according to some exemplary embodiments. FIG. 18B is a schematic diagram of an LED tube lamp including the exemplary mode determination circuit of FIG. 18A according to some exemplary embodiments. Referring to FIGS. 18A and 18B, mode determination circuit 2010 may be coupled to a rectifying circuit (e.g., the rectifying circuit 510 as illustrated in the previous figures), for receiving a rectified signal. In this exemplary embodiment, the mode determination circuit 2010 has two functions of allowing a continual current to flow through the LED unit 632 and regulating the continuity of current to flow through the LED unit 632. The mode determination circuit 2010 detects a state of a property of the rectified signal and selectively determines whether to perform a first mode or a second mode of lighting operation according to the state of the property of the rectified signal. When performing the first mode of lighting operation, the mode determination circuit 2010 allows a continual current, which in some embodiments may be a continuous current without cessation, to flow through the LED unit 632 until the external driving signal is disconnected from the LED tube lamp. When performing the second mode of lighting, the mode determination circuit 2010 regulates the continuity of current to flow through the LED unit 632, for example by allowing a discontinuous current to flow through the LED unit 632.

The mode determination circuit 2010 includes a first voltage divider 201, a second voltage divider 202, a resistor 2019, a capacitor 2020 and a control circuit 2018. The first voltage divider 201 includes a first resistor depicted in FIGS. 18A and 18B as resistor 2012, and a second resistor depicted in FIGS. 18A and 18B as resistor 2013. The resistor 2012 is connected to the resistor 2013 between the first output terminal 511 and the second output terminal 512. For example, one end of the first resistor 2012 is connected to a connection node C to which the first output terminal 511 is connected and the opposite end of the first resistor 2012 is connected to a connection node D to which one end of the second resistor 2013 is connected. In some embodiments, the opposite end of the second resistor 2013 is connected to the second output terminal 512 via at least a diode 2022 included in the first voltage divider 201, but the disclosure is not limited thereto. In some embodiments, the opposite end of the second resistor 2013 may be directly connected to the second output terminal 512. The second voltage divider 202 includes a third resistor depicted in FIGS. 18A and 18B as resistor 2014, and a fourth resistor depicted in FIGS. 18A and 18B as resistor 2015. The resistor 2014 is connected to the resistor 2015 between the first output terminal 511 and the second output terminal 512. For example, one end of the third resistor 2014 is connected to a connection node C to which the first output terminal 511 is connected and the opposite end of the third resistor 2014 is connected to a connection node E to which one end of the fourth resistor 2015 is connected. In some embodiments, the opposite end of the fourth resistor 2015 is directly connected to the second output terminal 512. The control circuit 2018 is coupled between the first voltage divider 201 and the LED unit 632, and the control circuit 2018 is also coupled between the second voltage divider 202 and the LED unit 632.

Referring to FIGS. 18A and 18B, in some embodiments, the mode determination circuit may not be coupled to a rectifying circuit. Thus, when the mode determination circuit 2010 is not coupled with a rectifying circuit, the mode determination circuit 2010 may detect a state of a property of the external driving signal (e.g., unrectified external driving signal) and selectively determines whether to perform a first mode or a second mode of lighting operation according to the state of the property of the external driving signal. When performing the first mode of lighting operation, the mode determination circuit 2010 allows a continual current, which in some embodiments may be a continuous current without cessation, to flow through the LED unit 632 until the external driving signal is disconnected from the LED tube lamp or a current generated from the input external driving signal is stopped from passing through the LED unit 632 as a result of any intended or unintended operation(s) of the LED tube lamp. When performing the second mode of lighting, the mode determination circuit 2010 regulates the continuity of current to flow through the LED unit 632, for example by allowing a discontinuous current to flow through the LED unit 632.

In some embodiments, the control circuit 2018 may be any circuit that has a function of controlling, for instance, a CPU or a MCU. The control circuit 2018 in this embodiment is an IC module having an input terminal VCC, an input terminal STP, an input terminal CS, an output terminal 2011 and an output terminal 2021. The input terminal VCC is connected to a connection node between the resistor 2019 and the capacitor 2020 for obtaining power from the rectifying circuit 510 for operation of the IC module. The output terminal 2011 is connected to a reference voltage such as the ground potential. The other output terminal 2021 is coupled to the LED unit 632. The first voltage divider 201 is configured for receiving the rectified signal from the rectifying circuit 510 to produce a first fraction voltage of the rectified signal at a connection node D between the first resistor 2012 and the second resistor 2013. The input terminal STP is connected to the connection node D. The control circuit 2018 receives the first fraction voltage at the terminal STP and determines whether to perform the first mode of lighting operation according to the first fraction voltage. In the first mode of lighting operation, the control circuit 2018 provides a continuous current at the output terminal 202 to allow the continual current to flow through the LED unit 632. The second voltage divider 202 is used for receiving the rectified signal from the rectifying circuit 510 to produce a second fraction voltage of the rectified signal at a connection node E between the third resistor 2014 and the fourth resistor 2015. The input terminal CS is connected to the connection node E. The control circuit 2018 receives the second fraction voltage at the input terminal CS and determines whether to perform the second mode of lighting operation according to the second fraction voltage. In the second mode of lighting operation, the control circuit 2018 provides a discontinuous current to regulate the continuity of the current to the LED unit 632.

In some embodiments, the control circuit 2018 includes a switching circuit 2024. The switching circuit 2024 is connected to the output terminals 2011 and 2021 of the control circuit 2018 to achieve the functions of allowing the continual current to flow through the LED unit 632 and regulating the continuity of current to flow through the LED unit 632. When performing the first mode of lighting operation, the control circuit 2018 allows the continuous current to flow through the LED unit 632 by continuously turning on, or maintaining an on state of, the switching circuit 2024. When performing the second mode of lighting operation, the control circuit 2018 allows the discontinuous current to flow through the LED unit 632 by alternately turning on and off the switching circuit 2024. The first mode of lighting operation may also be referred to as continuous-conduction-mode (CCM) in which the current in an energy transfer circuit (which typically comprises inductor(s) and/or resistor(s)) connected to the LED unit 632 does not go to zero between switching cycles of the switching circuit 2024. The second mode of lighting operation may also be referred to as discontinuous-conduction-mode (DCM) in which the current goes to zero during part of the switching cycle of the switching circuit 2014.

The switching circuit 2024 may include an electronic switch such as a transistor. The transistor may be a MOSFET, wherein the source terminal of the MOSFET is connected to the terminal 2011 to connect to a reference voltage such as the ground potential, and the drain terminal of the MOSFET is connected to the terminal 2021 to couple to the LED unit 632. Accordingly, in the first mode of lighting, the control circuit 2018 allows the continuous current to flow to the LED unit 632 by continuously turning on, or maintaining an on state of, the MOSFET, and in the second mode of lighting, the control circuit 2018 allows the discontinuous current to flow to the LED unit 632 by alternately turning on and off the MOSFET.

In some embodiments, the switching circuit 2024 may be a component of the LED tube lamp not included in control circuit 2018. If the LED tube lamp further includes the switching circuit 2024, the switching circuit 2024 is coupled between the control circuit 2018 and the LED unit 632.

Accordingly, upon the LED lighting tube lamp being supplied by an electrical ballast, the control circuit 2018 receives the first fraction voltage at the terminal STP and determines whether the first fraction voltage is in the first voltage range. If the first fraction voltage is in the first voltage range, the control circuit 2018 continuously turns on the switching circuit 2024 to allow a continuous current to flow through the LED unit 632 to perform the first mode of lighting. In addition, the control circuit 2018 receives the second fraction voltage at the terminal CS and determines whether the second fraction voltage is in the second voltage range. If the second fraction voltage is in the second voltage range, the control circuit 2018 alternately turns on and off the switching circuit 2024 to allow the discontinuous current to flow through the LED unit 632 to perform the second mode of lighting. The control circuit 2018 performs the first mode and second mode of lighting until the external driving signal is disconnected from the LED tube lamp. Once the LED tube lamp is started again, the control circuit 2018 determines again whether to perform the first mode or the second mode according to the first fraction voltage and the second fraction voltage of the rectified signal.

In some embodiments, the first voltage range is defined to encompass values less than a first voltage value or larger than a second voltage value which is larger than the first voltage value. Thus, the control circuit 2018 performs the first mode of lighting if the first fraction voltage is greater than the second voltage value or less than the first voltage value. For example, the first mode of lighting may comprise two first modes of lighting operations, and the control circuit 2018 performs one of the two first modes of lighting operation when the external driving signal is provided by an electronic ballast to the STP terminal of the control circuit 2018. When the external signal is provided by an electronic ballast to the STP terminal of the control circuit 2018, a voltage level at the STP terminal is larger than the second voltage value which is larger than the first voltage value. The control circuit 2018 performs the other of the two first modes of lighting operation when the external driving signal is provided by an inductive ballast to the STP terminal of the control circuit 2018. When the external signal is provided by an inductive ballast to the STP terminal of the control circuit 2018, a voltage level at the STP terminal is less than the first voltage value. The first voltage value may be in some embodiments between 0 V and 0.5 V, and may be in some embodiments between 0 V and 0.1 V, and may be in some embodiments 0.1 V. The second voltage value is in some embodiments 1 V, and may be in some embodiments 1.2 V. The second voltage range is defined to encompass values larger than a third voltage value and less than a fourth voltage value which is larger than the third voltage value. The third voltage value may be in some embodiments between 0.5 V and 0.85 V, and may be in some embodiments between 0.7 V and 0.8 V, and may be in some embodiments between 0.85 V and 1.0 V, and may be in some embodiments between 0.9 V and 0.98 V, and may be 0.95 V in some embodiments.

In some embodiments, the LED tube lamp further includes an RC circuit 203. The RC circuit 203 includes a resistor 2016 and a capacitor 2017. A first end of the resistor 2016 is connected to the connection node E. A second end of the resistor 2016 is connected to a first end of the capacitor 2017 and the input terminal CS of the control circuit 2018. A second end of the capacitor 2017 is connected to the second output terminal 512 of the rectifying circuit 510. The RC circuit 203 is configured to receive the second fraction voltage at node E. When the second fraction voltage is in the second voltage range, the capacitor 2017 is charged and discharged repeatedly to produce a voltage variation at the first end of the capacitor 2017 to alternately turn on and off the switching circuit 2024 to allow the discontinuous current to flow through the LED unit 632. Resistance value of resistor 2016 may be between 0.5 K and 4K ohms, and may be in some embodiments between 1 K and 3 K ohms, and may be in some embodiments 1K. Capacitance value of the capacitor 2017 may be in some embodiments between 1 nF and 500 nF, and may be in some embodiments between 20 nF and 30 nF, and may be in some embodiments 4.7 nF.

In some embodiments, the RC circuit 203 may be disposed with the second voltage divider 202. That is, the second voltage divider 202 includes the resistors 2014 and 2015 and further includes the resistor 2016 and the capacitor 2017. In other embodiments, the RC circuit 203 may be a component of the control circuit 2018. For example, the control circuit 2018 may include the IC module and further may include the resistor 2016 and the capacitor 2017. In this embodiment, the first end of the capacitor 2017 is connected to the switching circuit 2024 to control the switching circuit 2024.

Furthermore, in some embodiments, the RC circuit 203 may be replaced by a pulse width modulation circuit. The pulse width modulation circuit is coupled between the switching circuit 2024 and the connection node E. The pulse width modulation circuit is configured to receive the second fraction voltage and then produce a pulse signal with a duty-cycle responsive to the second fraction voltage, and the pulse signal is used to alternately turning on and off the switching circuit 2024 to allow the discontinuous current to flow to the LED unit 632.

In applications, when a first type of electronic ballast is applied, during the starting period (less than 100 ms, typically between about 20-30 ms) of the LED tube lamp, the voltage at node C may be between 200-300V, then the voltage at the node C rises when the ballast operates in steady state, causing the first fraction voltage at node D rise. When the second fraction voltage reaches the first voltage range, the switching circuit 2024 is turned on and being kept in conduction state. In this situation, a constant current is provided to the LED unit 632. In some embodiments, resistance values of resistors 2012 and 2013 may be 540 K ohms and 1 K ohms, respectively.

Similarly, when a second type of the electronic ballast is applied, during the starting period, the second fraction voltage at node E may rise to reach the second voltage range when the electronic ballast operates in steady state. Then the switching circuit 2024 is alternately turned on and off by the RC circuit 203 or the pulse width modulation circuit. In this situation, a discontinuous current is provided to the LED unit 632. In some embodiments, resistance values of resistors 2014 and 2015 may be 420 K ohms and 1 K ohms, respectively.

When an inductive ballast is applied, the characteristic of the inductive ballast is that its current or voltage periodically crosses zero value as the current or voltage signal proceeds with time. During the starting period of the LED tube lamp powered by the commercial power, the first fraction voltage produced by the first voltage divider 201 may be less than the first voltage value which facilitates the switching circuit 2024 to be turned on and maintain a conducting state. Therefore, the control circuit 2018 allows a constant current to flow to the LED unit 632.

In some embodiments, the mode determination circuit 2010 comprises a ballast interface circuit as an interface between the LED tube lamp and an electrical ballast used to supply the LED tube lamp. Accordingly, The LED tube lamp can be applied to or be supplied by each of an electronic ballast or an inductive ballast.

In addition, the mode determination circuit 2010 has another function of being open-circuit for a period during the initial stage of starting the LED tube lamp for preventing the energy of the AC driving signal from reaching the LED module 630. The mode determination circuit 2010 will not enter a conduction state until a period of delay passes. The period of delay may be a defined as a delay which is between about 10 milliseconds and about 1 second.

In some embodiments, the LED tube lamp may include essentially no current-limiting capacitor coupled in series to the LED unit 632. For example, an equivalent current-limiting capacitance coupled in series to the LED unit 632 may be below about 0.1 nF.

In some embodiments, in order to stabilize the voltage at the node D, the mode determination circuit 2010 may further comprise a capacitor connected in parallel with the resistor 2013. The capacitance of the capacitor may be in some embodiments between 100 nF and 500 nF, and may be in some embodiments between 200 nF to 300 nF, and may be in some embodiments 220 nF.

In some embodiments, the mode determination circuit 2010 may further comprises at least a diode 2022 coupled between the first voltage divider 201 and the second output terminal 502. The voltage drop of the diode 2022 when electrically conducting is larger than the first voltage value.

Thereby, the voltage level at node D is always larger than the first voltage value, such that the mode determination circuit 2010 always performs the first mode of lighting with the first fraction voltage higher than the second voltage value.

In some embodiments, in order to increase a voltage rating of the IC module, the mode determination circuit 2010 may further include a discharge tube 2023. Two ends of the discharge tube 2023 are connected to the output terminal 2021 and the ground potential respectively. A voltage rating of the discharge tube 2023 in some embodiments may be between 300 V and 600 V, and may be in some embodiments between 400 V and 500V, and may be in some embodiments 400 V. In some embodiments, the discharge tube 2023 also may be replaced by a thyristor.

In some embodiments, the property of the rectified signal may be the frequency level or voltage level of the rectified signal. For example, a frequency detection circuit or other voltage detection circuits can be used to replace the voltage divider(s). Thus, the mode determination circuit 2010 can detect the voltage level or frequency level of the rectified signal to determine whether to perform the first mode and the second mode of lighting.

Referring to FIG. 18B again, in order to reduce a pulse current result from electrical ballasts, the LED tube lamp may further include a noise suppressing circuit 570 coupled between the mode determination circuit 2010 and the LED unit 632, and the noise suppressing circuit 570 is connected in series with the LED unit 632. In some embodiments, the noise-suppressing circuit 570 is an optional element and therefore may be omitted. In one embodiment, if noise-suppressing circuit 570 is omitted, one end (i.e., the cathode as depicted in FIG. 18B) of LED unit 632 is directly connected to the output terminal 2021 of the mode determination circuit 2010.

In some embodiments, the noise suppressing circuit 570 includes an inductor 571 connected to the cathode of the LED unit 632 between the LED unit 632 and the output terminal 2021 of the mode determination circuit 2010 for reducing an abrupt change in the current provided to the LED unit 632. However, a current flowing through the inductor 571 may be larger than a current threshold, for instance, 0.35 A. Therefore, an over-current may be generated and the inductor 571 may be overheated due to the generation of the overcurrent. In order to eliminate the overcurrent, noise suppressing circuit 570 may further include a resistor 573, a resistor 574 and a transistor 575 to form an over-current protection circuit. The first terminal of the transistor 575 is connected to a connection node between the LED unit 632 and the inductor 571 to connect to the first end of the inductor 571 to the cathode of the LED unit 632, the second terminal of the transistor 575 (e.g., the gate terminal of the transistor 575) is connected to the second end of the inductor 571, and the third terminal of the transistor 575 is coupled to the output terminal 2021 of the mode determination circuit 2010. The resistor 574 is connected between the third terminal and the second terminal of the transistor 575. The resistor 573 is connected between the first terminal and the second terminal of the transistor 575.

The over-current protection circuit will be triggered when the current flowing through the inductor 571 is larger than a predefined current threshold. In general, the current from the LED unit 632 flows through the inductor 571 and resistor 574 thereby incurring a voltage drop across the resistor 574. So, if the current increases, the voltage drop may increase to reach a conducting voltage (e.g. 0.7 V) of the transistor 575 thereby to turn on the transistor 575 to conduct current. Accordingly, when the transistor 575 operates in a conducting state, the conducting state of the transistor 575 diverts some current from flowing through the inductor 571 thus achieving the purpose of preventing excessive current from flowing through the inductor 571. The transistor 575 may comprise a BJT or a MOSFET. In some embodiments, the inductor 571 may be connected in parallel with the anti-flickering circuit 550 and 650 as depicted in FIGS. 16A and 16B, respectively. In some embodiments, inductance value of the inductor 571 may be between 1 mH and 10 mH, and may be in some embodiments between 1 mH and 8 mH, and may be in some embodiments 6 mH.

In some embodiments, the noise-suppressing circuit 570 may further include a freewheel diode 572 for providing a current path. The cathode of the freewheel diode 572 is connected to the cathode of the LED unit 632 and the anode of the freewheel diode 572 is connected to the second terminal (e.g., the gate terminal) of the transistor 575. A portion of the current flowing through the inductor 571 flows through the freewheel diode 572.

In some embodiments, the freewheel diode 572, resistor 573, resistor 574 and transistor 575 are optional elements and therefore can be omitted. In one embodiment, if freewheel diode 572, resistor 573, resistor 574 and transistor 575 are omitted, the second end of the inductor 571 is directly connected to the output terminal 2021 of the mode determination circuit 2010.

In some embodiments, noise-suppressing circuit 570 may be connected between a rectifying circuit 510 and the LED unit 632. In such cases, the function of the noise-suppressing circuit 570 will not be affected.

In some embodiments, the filtering circuit 520 may be coupled between the mode determination circuit 2010 and the LED unit 632, and capacitor 625 can be a component of the filtering circuit 520.

In various embodiments, the mode determination circuit 2010 may be referred to as a ballast interface circuit. The ballast interface circuit may also be coupled to the first external connection terminal and the second external connection terminal between the lamp driving circuit 505 such as an electrical ballast and the LED unit 632 for receiving an external driving signal from the electrical ballast for transmitting power from the electrical ballast to the LED unit 632. In some embodiments, the ballast interface circuit includes a detecting circuit and a control circuit coupled to the detecting circuit. The detecting circuit detects a state of a property of the external driving signal. In some embodiments, the property of the external driving signal is the voltage level of the external driving signal. The detecting circuit includes the first voltage divider 201 and the second voltage divider 202 in FIG. 18A for receiving the external driving signal to obtain a first fraction voltage of the external driving signal and a second fraction voltage of the external driving signal. The detecting circuit determines whether the first fraction voltage is in the first voltage range, and determines whether the second fraction voltage is in the second voltage range. According to the voltage level of external driving signal, the control circuit selectively determines to perform a first mode or a second mode of lighting. When performing the first mode of lighting, the control circuit allows continual current to flow through the LED unit 632 until the external driving signal is disconnected from the LED tube lamp; and when performing the second mode of lighting, the control circuit regulates the continuity of current to flow through the LED unit 632.

In other embodiments, the property of the external driving signal may be the frequency level of the external driving signal. In various embodiments, a frequency detection circuit or other voltage detection circuits can be used to replace the first voltage divider 201 and the second voltage divider 202. Accordingly, the ballast interface circuit can detect the voltage level or the frequency level of the external driving signal to determine whether to perform the first mode and the second mode of lighting.

Figure 18C:
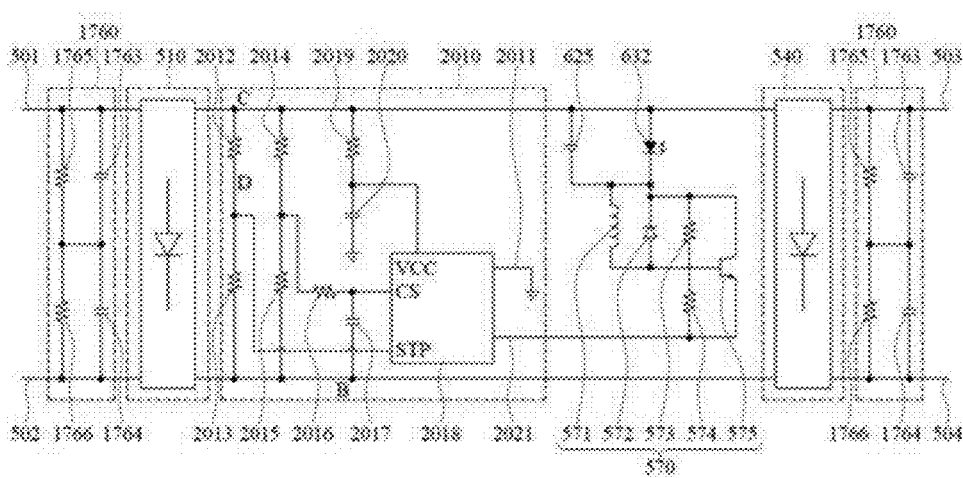
FIG. 18C is a schematic diagram of an LED tube lamp according to some exemplary embodiments, which includes an embodiment of the mode determination circuit.

FIG. 18C is a schematic diagram of an LED tube lamp according to some embodiments, which includes an embodiment of the mode determination circuit 2010 of FIG. 18A. Compared to that shown in FIG. 18B, the present embodiment comprises the rectifying circuits 510 and 540, the capacitor 625, the noise suppressing circuit 570, and the LED unit 632, and further includes two filament-simulating circuits 1760. The filament-simulating circuits 1760 are respectively coupled between the pins 501 and 502 and coupled between the pins 503 and 504. The filament-simulating circuit 1760 includes capacitors 1763 and 1764, and the resistors 1765 and 1766. The capacitors 1763 and 1764 are connected in series and coupled between the pins 503 and 504 and coupled between the pins 501 and 502. The resistors 1765 and 1766 are connected in series and coupled between the pins 503 and 504 and coupled between the pins 501 and 502. Furthermore, the connection node between the capacitors 1763 and 1764 is coupled to that of the resistors 1765 and 1766. Accordingly, the LED tube lamp in this embodiment can be applied to or be supplied by programmed-start ballasts. When a programmed-start ballast is applied, in a process of preheating, an AC current flows through the capacitors 1763 and 1764 and resistors 1765 and 1766 to achieve the function of simulating the operation of actual filaments. Accordingly, the LED tube lamp is compatible with the programmed-start ballast. That is, the programmed-start ballast can successfully start the LED tube lamp in the embodiments.

Resistance values of resistors 1766 and 1765 may be between 10 K and 1 M ohms, and may be in some embodiments between 100 K and 1 M ohms, and may be in some embodiments 100 K. Capacitance values of the capacitors 1763 and 1764 may be in some embodiments between 3 nF and 2 pF, and may be in some embodiments 3 nF and 100 nF, and may be in some embodiments 4.7 nF.

In some embodiments, resistors 1766 and 1765 may be resistors with negative temperature coefficient. If the filament-simulating circuits 1760 includes resistors 1766 and 1765 with negative temperature coefficient, resistance value of the resistors 1766 and 1765 may be no greater than 15 ohms, and may be in some embodiments between 2 to 10 ohms, and may be in some embodiments between 4 ohms and 5 ohms.

In applications, with reference back to FIGS. 7 and 8, the filtering circuit 520, one of the filament-simulating circuits 1760, the rectifying circuit 510, anti-flickering circuit 550 and 650, and the LED module 630 may be disposed on the long circuit sheet 251 of the LED light strip 2. The mode determination circuit 2010, another filament-simulating circuit 1760, noise suppressing circuit 570, and the rectifying circuit 540 may be disposed on the short circuit board 253. In some embodiments, if filtering circuit 520 includes the capacitor 625, the capacitor 625 may be implemented by two film capacitors connected to each other and to be disposed on the long circuit sheet 251 of the LED light strip 2. In some embodiments, both of the filament-simulating circuits 1760 may be disposed on the short circuit board 253 together. In one embodiment, the inductance 571 may be disposed on the short circuit board 253 if the inductance value of the inductor 571 is 6 mH. This 6-mh inductor is too heavy to dispose on the long circuit sheet 251 due to the difficulty of the manufacturing of the long circuit sheet 251 with bendable structure.

With reference back to FIG. 6, welding defects may exist between the soldering pads "a" of power supply 5 and soldering pads "b" of the LED light strip 2. Welding defects may block the intended current path between the power supply 5 and the LED light strip 2 (which light strip 2 may comprise a flexible printed circuit board (FPC)) after supplying power, such that a high voltage (typically 600 V) exists between an anode electrode and cathode electrode of the power supply 5, or between a anode electrode and a cathode electrode of the LED unit 632 on the LED light strip 2. Such high voltage causes the LED module 630 having one or more LED unit 632 damages from sparkling or arcing.

To prevent (the effects caused by) arcing and sparkling, the LED tube lamp may include a discharge device 620. The discharge device 620 is disposed on the circuit board and configured to connect in parallel with the LED unit 632 (i.e., connected between anode and cathode electrodes of the LED unit 632) on the LED light strip 2. In a case that power is supplied normally, the LED 631 limits the voltage between the anode and cathode electrodes of the LED unit 632. Under such circumstances, the voltage across the LED unit 632 may be less than 200 V. But, if welding defects exist, after the LED tube lamp is supplied by power, an instantaneously high (e.g., larger than a predefined threshold voltage) voltage may occur across the anode and cathode electrodes of the LED unit 632. Then, the discharge device 620 can discharge electricity to serve to prevent the instantaneously high voltage across the LED unit 632 from being larger than the predefined threshold voltage. The discharge device 620 thus protects the LED unit 632 against arcing or sparkling due to the instantaneously high voltage across the LED unit 632. In some embodiments, the discharge device 620 may be disposed on the short circuit board 253.

The discharge device 620 may include a capacitor, a discharge tube, or a diode. The discharge device 620 may have a voltage rating in the range of about 1.2 to 5 times that of the LED unit 632. And the voltage rating of the capacitor may be between 200-600 V, for example. In addition, if the discharge device 620 includes a capacitor, the capacitor can achieve a function of filtering when power is normally supplied. In this function, the discharge device 620 may be a component of the filtering circuit 520.

In various embodiments of the LED tube lamp according to this disclosure, each of the two end caps respectively coupled to two opposite ends of the lamp tube may comprise at least one opening which penetrates through the end cap. In such case, (at least a component of) the protection circuit may preferably be positioned closer to the at least one opening of the end cap than some other electronic components of the power supply (module) are, in order to facilitate heat dissipating or radiating by the protection circuit.

Figure 19A:
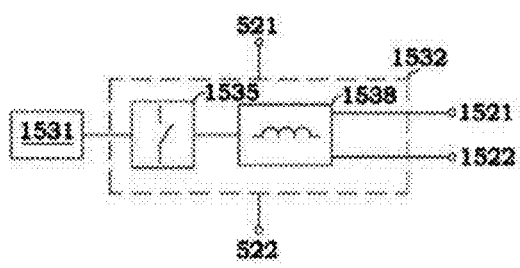
FIG. 19A is a block diagram of a driving circuit according to some embodiments.

FIG. 19A is a block diagram of the driving circuit according to an embodiment of the present invention. Referring to FIG. 19A, the driving circuit includes a controller 1531, and a conversion circuit 1532 for power conversion based on a current source, for driving the LED module to emit light. Conversion circuit 1532 includes a switching circuit 1535 and an energy storage circuit 1538. And conversion circuit 1532 is coupled to filtering output terminals 521 and 522 to receive and then convert a filtered signal, under the control by controller 1531, into a driving signal at driving output terminals 1521 and 1522 for driving the LED module. Under the control by controller 1531, the driving signal output by conversion circuit 1532 comprises a steady current, making the LED module emitting steady light.

Figure 19B:
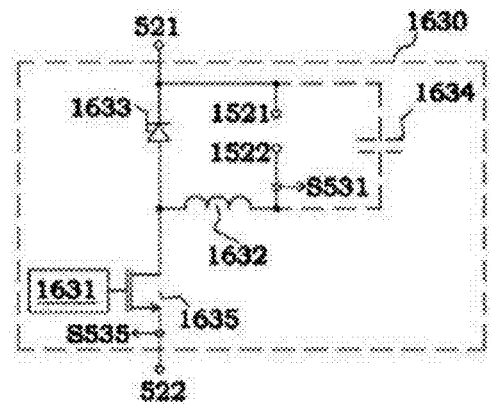
FIG. 19B is a schematic diagram of a driving circuit according to some embodiments.

FIG. 19B is a schematic diagram of the driving circuit according to an embodiment of the present invention. Referring to FIG. 19B, a driving circuit 1630 in this embodiment comprises a buck DC-to-DC converter circuit having a controller 1631 and a converter circuit. The converter circuit includes an inductor 1632, a diode 1633 for "freewheeling" of current, a capacitor 1634, and a switch 1635. Driving circuit 1630 is coupled to filtering output terminals 521 and 522 to receive and then convert a filtered signal into a driving signal for driving an LED module connected between driving output terminals 1521 and 1522.

In this embodiment, switch 1635 comprises a metal-oxide-semiconductor field-effect transistor (MOSFET) and has a first terminal coupled to the anode of freewheeling diode 1633, a second terminal coupled to filtering output terminal 522, and a control terminal coupled to controller 1631 used for controlling current conduction or cutoff between the first and second terminals of switch 1635. Driving output terminal 1521 is connected to filtering output terminal 521, and driving output terminal 1522 is connected to an end of inductor 1632, which has another end connected to the first terminal of switch 1635. Capacitor 1634 is coupled between driving output terminals 1521 and 1522, to stabilize the voltage between driving output terminals 1521 and 1522. Freewheeling diode 1633 has a cathode connected to driving output terminal 1521.

Next, a description follows as to an exemplary operation of driving circuit 1630.

Controller 1631 is configured for determining when to turn switch 1635 on (in a conducting state) or off (in a cutoff state), according to a current detection signal S535 and/or a current detection signal S531. For example, in some embodiments, controller 1631 is configured to control the duty cycle of switch 1635 being on and switch 1635 being off, in order to adjust the size or magnitude of the driving signal. Current detection signal S535 represents the magnitude of current through switch 1635. Current detection signal S531 represents the magnitude of current through the LED module coupled between driving output terminals 1521 and 1522. According to any of current detection signal S535 and current detection signal S531, controller 1631 can obtain information on the magnitude of power converted by the converter circuit. When switch 1635 is switched on, a current of a filtered signal is input through filtering output terminal 521, and then flows through capacitor 1634, driving output terminal 1521, the LED module, inductor 1632, and switch 1635, and then flows out from filtering output terminal 522. During this flowing of current, capacitor 1634 and inductor 1632 are performing storing of energy. On the other hand, when switch 1635 is switched off, capacitor 1634 and inductor 1632 perform releasing of stored energy by a current flowing from freewheeling capacitor 1633 to driving output terminal 1521 to make the LED module continuing to emit light.

It's worth noting that capacitor 1634 is an optional element, so it can be omitted and is thus depicted in a dotted line in FIG. 19B. In some application environments, the natural characteristic of an inductor to oppose instantaneous change in electric current passing through the inductor may be used to achieve the effect of stabilizing the current through the LED module, thus omitting capacitor 1634.

Figure 19C:
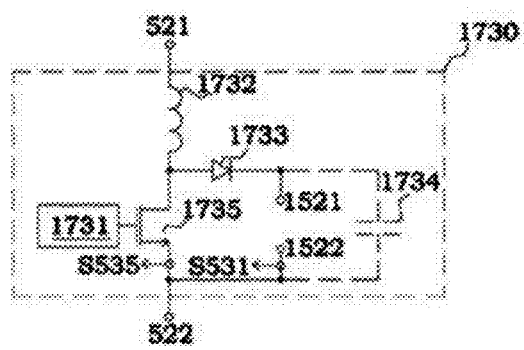
FIG. 19C is a schematic diagram of a driving circuit according to some embodiments.

FIG. 19C is a schematic diagram of the driving circuit according to an embodiment of the present invention. Referring to FIG. 19C, a driving circuit 1730 in this embodiment comprises a boost DC-to-DC converter circuit having a controller 1731 and a converter circuit. The converter circuit includes an inductor 1732, a diode 1733 for "freewheeling" of current, a capacitor 1734, and a switch 1735. Driving circuit 1730 is configured to receive and then convert a filtered signal from filtering output terminals 521 and 522 into a driving signal for driving an LED module coupled between driving output terminals 1521 and 1522.

Inductor 1732 has an end connected to filtering output terminal 521, and another end connected to the anode of freewheeling diode 1733 and a first terminal of switch 1735, which has a second terminal connected to filtering output terminal 522 and driving output terminal 1522. Freewheeling diode 1733 has a cathode connected to driving output terminal 1521. And capacitor 1734 is coupled between driving output terminals 1521 and 1522.

Controller 1731 is coupled to a control terminal of switch 1735, and is configured for determining when to turn switch 1735 on (in a conducting state) or off (in a cutoff state), according to a current detection signal S535 and/or a current detection signal S531. When switch 1735 is switched on, a current of a filtered signal is input through filtering output terminal 521, and then flows through inductor 1732 and switch 1735, and then flows out from filtering output terminal 522. During this flowing of current, the current through inductor 1732 increases with time, with inductor 1732 being in a state of storing energy, while capacitor 1734 enters a state of releasing energy, making the LED module continuing to emit light. On the other hand, when switch 1735 is switched off, inductor 1732 enters a state of releasing energy as the current through inductor 1732 decreases with time. In this state, the current through inductor 1732 then flows through freewheeling diode 1733, capacitor 1734, and the LED module, while capacitor 1734 enters a state of storing energy.

It's worth noting that capacitor 1734 is an optional element, so it can be omitted and is thus depicted in a dotted line in FIG. 19C. When capacitor 1734 is omitted and switch 1735 is switched on, the current of inductor 1732 does not flow through the LED module, making the LED module not emit light; but when switch 1735 is switched off, the current of inductor 1732 flows through freewheeling diode 1733 to reach the LED module, making the LED module emit light. Therefore, by controlling the time that the LED module emits light, and the magnitude of current through the LED module, the average luminance of the LED module can be stabilized to be above a defined value, thus also achieving the effect of emitting a steady light.

Figure 19D:
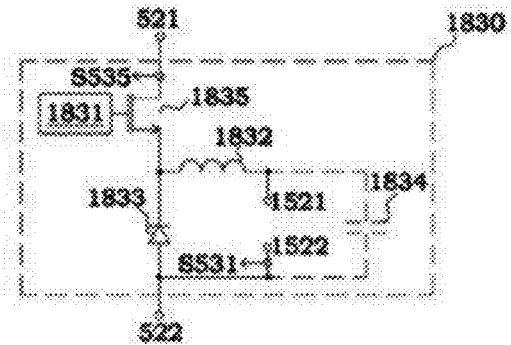
FIG. 19D is a schematic diagram of a driving circuit according to some embodiments.

FIG. 19D is a schematic diagram of the driving circuit according to an embodiment of the present invention. Referring to FIG. 19D, a driving circuit 1830 in this embodiment comprises a buck DC-to-DC converter circuit having a controller 1831 and a converter circuit. The converter circuit includes an inductor 1832, a diode 1833 for "freewheeling" of current, a capacitor 1834, and a switch 1835. Driving circuit 1830 is coupled to filtering output terminals 521 and 522 to receive and then convert a filtered signal into a driving signal for driving an LED module connected between driving output terminals 1521 and 1522.

Switch 1835 has a first terminal coupled to filtering output terminal 521, a second terminal coupled to the cathode of freewheeling diode 1833, and a control terminal coupled to controller 1831 to receive a control signal from controller 1831 for controlling current conduction or cutoff between the first and second terminals of switch 1835. The anode of freewheeling diode 1833 is connected to filtering output terminal 522 and driving output terminal 1522. Inductor 1832 has an end connected to the second terminal of switch 1835, and another end connected to driving output terminal 1521. Capacitor 1834 is coupled between driving output terminals 1521 and 1522, to stabilize the voltage between driving output terminals 1521 and 1522.

Controller 1831 is configured for controlling when to turn switch 1835 on (in a conducting state) or off (in a cutoff state), according to a current detection signal S535 and/or a current detection signal S531. When switch 1835 is switched on, a current of a filtered signal is input through filtering output terminal 521, and then flows through switch 1835, inductor 1832, and driving output terminals 1521 and 1522, and then flows out from filtering output terminal 522. During this flowing of current, the current through inductor 1832 and the voltage of capacitor 1834 both increase with time, so inductor 1832 and capacitor 1834 are in a state of storing energy. On the other hand, when switch 1835 is switched off, inductor 1832 is in a state of releasing energy and thus the current through it decreases with time. In this case, the current through inductor 1832 circulates through driving output terminals 1521 and 1522, freewheeling diode 1833, and back to inductor 1832.

It's worth noting that capacitor 1834 is an optional element, so it can be omitted and is thus depicted in a dotted line in FIG. 19D. When capacitor 1834 is omitted, no matter whether switch 1835 is turned on or off, the current through inductor 1832 will flow through driving output terminals 1521 and 1522 to drive the LED module to continue emitting light.

Figure 19E:
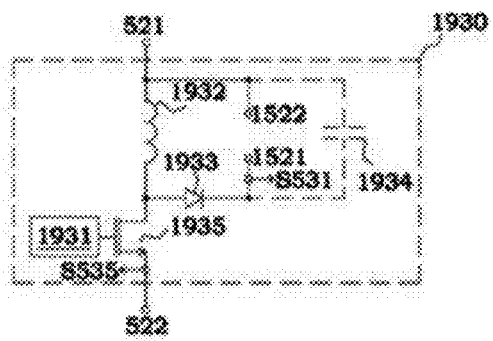
FIG. 19E is a schematic diagram of a driving circuit according to some embodiments.

FIG. 19E is a schematic diagram of the driving circuit according to an embodiment of the present invention. Referring to FIG. 19E, a driving circuit 1930 in this embodiment comprises a buck DC-to-DC converter circuit having a controller 1931 and a converter circuit. The converter circuit includes an inductor 1932, a diode 1933 for "freewheeling" of current, a capacitor 1934, and a switch 1935. Driving circuit 1930 is coupled to filtering output terminals 521 and 522 to receive and then convert a filtered signal into a driving signal for driving an LED module connected between driving output terminals 1521 and 1522.

Inductor 1932 has an end connected to filtering output terminal 521 and driving output terminal 1522, and another end connected to a first end of switch 1935. Switch 1935 has a second end connected to filtering output terminal 522, and a control terminal connected to controller 1931 to receive a control signal from controller 1931 for controlling current conduction or cutoff of switch 1935. Freewheeling diode 1933 has an anode coupled to a node connecting inductor 1932 and switch 1935, and a cathode coupled to driving output terminal 1521. Capacitor 1934 is coupled to driving output terminals 1521 and 1522, to stabilize the driving of the LED module coupled between driving output terminals 1521 and 1522.

Controller 1931 is configured for controlling when to turn switch 1935 on (in a conducting state) or off (in a cutoff state), according to a current detection signal S531 and/or a current detection signal S535. When switch 1935 is turned on, a current is input through filtering output terminal 521, and then flows through inductor 1932 and switch 1935, and then flows out from filtering output terminal 522. During this flowing of current, the current through inductor 1932 increases with time, so inductor 1932 is in a state of storing energy; but the voltage of capacitor 1934 decreases with time, so capacitor 1934 is in a state of releasing energy to keep the LED module continuing to emit light. On the other hand, when switch 1935 is turned off, inductor 1932 is in a state of releasing energy and its current decreases with time. In this case, the current through inductor 1932 circulates through freewheeling diode 1933, driving output terminals 1521 and 1522, and back to inductor 1932. During this circulation, capacitor 1934 is in a state of storing energy and its voltage increases with time.

It's worth noting that capacitor 1934 is an optional element, so it can be omitted and is thus depicted in a dotted line in FIG. 19E. When capacitor 1934 is omitted and switch 1935 is turned on, the current through inductor 1932 doesn't flow through driving output terminals 1521 and 1522, thereby making the LED module not emit light. On the other hand, when switch 1935 is turned off, the current through inductor 1932 flows through freewheeling diode 1933 and then the LED module to make the LED module emit light. Therefore, by controlling the time that the LED module emits light, and the magnitude of current through the LED module, the average luminance of the LED module can be stabilized to be above a defined value, thus also achieving the effect of emitting a steady light.

Figure 20A:
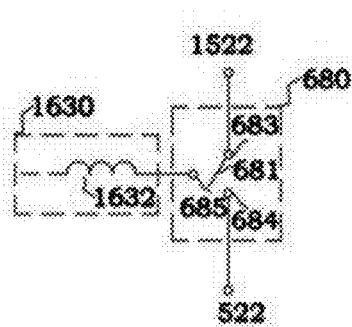
FIG. 20A is a schematic diagram of a mode switching circuit in an LED lamp according to some embodiments.

FIG. 20A is a schematic diagram of the mode switching circuit in an LED lamp according to an embodiment of the present invention. Referring to FIG. 20A, a mode switching circuit 680 includes a mode switch 681 suitable for use with the driving circuit 1630 in FIG. 19B. Referring to FIGS. 20A and 19B, mode switch 681 has three terminals 683, 684, and 685, wherein terminal 683 is coupled to driving output terminal 1522, terminal 684 is coupled to filtering output terminal 522, and terminal 685 is coupled to the inductor 1632 in driving circuit 1630.

When mode switching circuit 680 determines to perform a first driving mode, mode switch 681 conducts current in a first conductive path through terminals 683 and 685 and a second conductive path through terminals 683 and 684 is in a cutoff state. In this case, driving output terminal 1522 is coupled to inductor 1632, and therefore driving circuit 1630 is working normally, which working includes receiving a filtered signal from filtering output terminals 521 and 522 and then transforming the filtered signal into a driving signal, output at driving output terminals 1521 and 1522 for driving the LED module.

When mode switching circuit 680 determines to perform a second driving mode, mode switch 681 conducts current in the second conductive path through terminals 683 and 684 and the first conductive path through terminals 683 and 685 is in a cutoff state. In this case, driving output terminal 1522 is coupled to filtering output terminal 522, and therefore driving circuit 1630 stops working, and a filtered signal is input through filtering output terminals 521 and 522 to driving output terminals 1521 and 1522 for driving the LED module, while bypassing inductor 1632 and switch 1635 in driving circuit 1630.

Figure 20B:
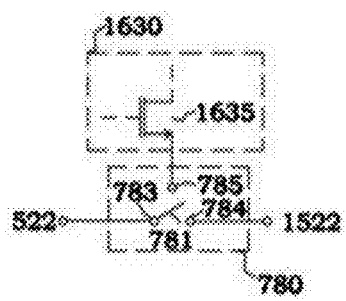
FIG. 20B is a schematic diagram of a mode switching circuit in an LED lamp according to some embodiments.

FIG. 20B is a schematic diagram of the mode switching circuit in an LED lamp according to an embodiment of the present invention. Referring to FIG. 20B, a mode switching circuit 780 includes a mode switch 781 suitable for use with the driving circuit 1630 in FIG. 19B. Referring to FIGS. 20B and 19B, mode switch 781 has three terminals 783, 784, and 785, wherein terminal 783 is coupled to filtering output terminal 522, terminal 784 is coupled to driving output terminal 1522, and terminal 785 is coupled to switch 1635 in driving circuit 1630.

When mode switching circuit 780 determines to perform a first driving mode, mode switch 781 conducts current in a first conductive path through terminals 783 and 785 and a second conductive path through terminals 783 and 784 is in a cutoff state. In this case, filtering output terminal 522 is coupled to switch 1635, and therefore driving circuit 1630 is working normally, which working includes receiving a filtered signal from filtering output terminals 521 and 522 and then transforming the filtered signal into a driving signal, output at driving output terminals 1521 and 1522 for driving the LED module.

When mode switching circuit 780 determines to perform a second driving mode, mode switch 781 conducts current in the second conductive path through terminals 783 and 784 and the first conductive path through terminals 783 and 785 is in a cutoff state. In this case, driving output terminal 1522 is coupled to filtering output terminal 522, and therefore driving circuit 1630 stops working, and a filtered signal is input through filtering output terminals 521 and 522 to driving output terminals 1521 and 1522 for driving the LED module, while bypassing inductor 1632 and switch 1635 in driving circuit 1630.

Figure 20C:
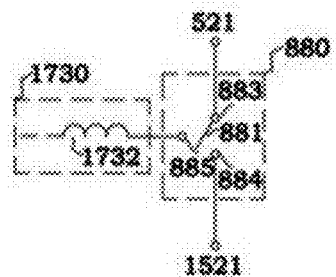
FIG. 20C is a schematic diagram of a mode switching circuit in an LED lamp according to some embodiments.

FIG. 20C is a schematic diagram of the mode switching circuit in an LED lamp according to an embodiment of the present invention. Referring to FIG. 20C, a mode switching circuit 880 includes a mode switch 881 suitable for use with the driving circuit 1730 in FIG. 19C. Referring to FIGS. 20C and 19C, mode switch 881 has three terminals 883, 884, and 885, wherein terminal 883 is coupled to filtering output terminal 521, terminal 884 is coupled to driving output terminal 1521, and terminal 885 is coupled to inductor 1732 in driving circuit 1730.

When mode switching circuit 880 determines to perform a first driving mode, mode switch 881 conducts current in a first conductive path through terminals 883 and 885 and a second conductive path through terminals 883 and 884 is in a cutoff state. In this case, filtering output terminal 521 is coupled to inductor 1732, and therefore driving circuit 1730 is working normally, which working includes receiving a filtered signal from filtering output terminals 521 and 522 and then transforming the filtered signal into a driving signal, output at driving output terminals 1521 and 1522 for driving the LED module.

When mode switching circuit 880 determines to perform a second driving mode, mode switch 881 conducts current in the second conductive path through terminals 883 and 884 and the first conductive path through terminals 883 and 885 is in a cutoff state. In this case, driving output terminal 1521 is coupled to filtering output terminal 521, and therefore driving circuit 1730 stops working, and a filtered signal is input through filtering output terminals 521 and 522 to driving output terminals 1521 and 1522 for driving the LED module, while bypassing inductor 1732 and freewheeling diode 1733 in driving circuit 1730.

Figure 20D:
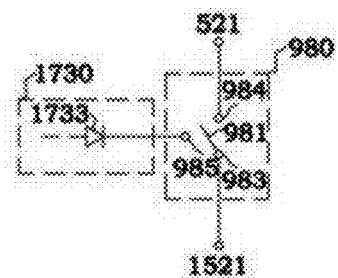
FIG. 20D is a schematic diagram of a mode switching circuit in an LED lamp according to some embodiments.

FIG. 20D is a schematic diagram of the mode switching circuit in an LED lamp according to an embodiment of the present invention. Referring to FIG. 20D, a mode switching circuit 980 includes a mode switch 981 suitable for use with the driving circuit 1730 in FIG. 19C. Referring to FIGS. 20D and 19C, mode switch 981 has three terminals 983, 984, and 985, wherein terminal 983 is coupled to driving output terminal 1521, terminal 984 is coupled to filtering output terminal 521, and terminal 985 is coupled to the cathode of diode 1733 in driving circuit 1730.

When mode switching circuit 980 determines to perform a first driving mode, mode switch 981 conducts current in a first conductive path through terminals 983 and 985 and a second conductive path through terminals 983 and 984 is in a cutoff state. In this case, filtering output terminal 521 is coupled to the cathode of diode 1733, and therefore driving circuit 1730 is working normally, which working includes receiving a filtered signal from filtering output terminals 521 and 522 and then transforming the filtered signal into a driving signal, output at driving output terminals 1521 and 1522 for driving the LED module.

When mode switching circuit 980 determines to perform a second driving mode, mode switch 981 conducts current in the second conductive path through terminals 983 and 984 and the first conductive path through terminals 983 and 985 is in a cutoff state. In this case, driving output terminal 1521 is coupled to filtering output terminal 521, and therefore driving circuit 1730 stops working, and a filtered signal is input through filtering output terminals 521 and 522 to driving output terminals 1521 and 1522 for driving the LED module, while bypassing inductor 1732 and freewheeling diode 1733 in driving circuit 1730.

Figure 20E:
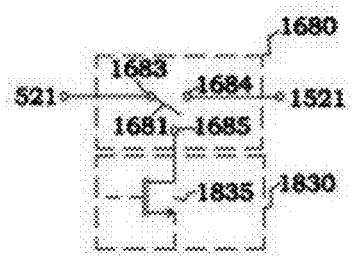
FIG. 20E is a schematic diagram of a mode switching circuit in an LED lamp according to some embodiments.

FIG. 20E is a schematic diagram of the mode switching circuit in an LED lamp according to an embodiment of the present invention. Referring to FIG. 20E, a mode switching circuit 1680 includes a mode switch 1681 suitable for use with the driving circuit 1830 in FIG. 19D. Referring to FIGS. 20E and 19D, mode switch 1681 has three terminals 1683, 1684, and 1685, wherein terminal 1683 is coupled to filtering output terminal 521, terminal 1684 is coupled to driving output terminal 1521, and terminal 1685 is coupled to switch 1835 in driving circuit 1830.

When mode switching circuit 1680 determines to perform a first driving mode, mode switch 1681 conducts current in a first conductive path through terminals 1683 and 1685 and a second conductive path through terminals 1683 and 1684 is in a cutoff state. In this case, filtering output terminal 521 is coupled to switch 1835, and therefore driving circuit 1830 is working normally, which working includes receiving a filtered signal from filtering output terminals 521 and 522 and then transforming the filtered signal into a driving signal, output at driving output terminals 1521 and 1522 for driving the LED module.

When mode switching circuit 1680 determines to perform a second driving mode, mode switch 1681 conducts current in the second conductive path through terminals 1683 and 1684 and the first conductive path through terminals 1683 and 1685 is in a cutoff state. In this case, driving output terminal 1521 is coupled to filtering output terminal 521, and therefore driving circuit 1830 stops working, and a filtered signal is input through filtering output terminals 521 and 522 to driving output terminals 1521 and 1522 for driving the LED module, while bypassing inductor 1832 and switch 1835 in driving circuit 1830.

Figure 20F:
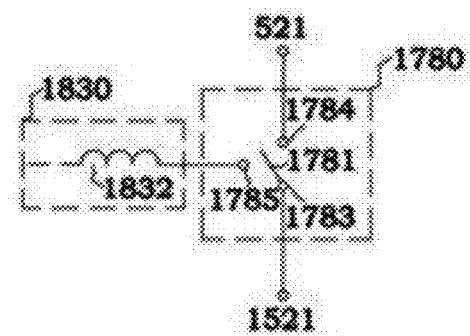
FIG. 20F is a schematic diagram of a mode switching circuit in an LED lamp according to some embodiments.

FIG. 20F is a schematic diagram of the mode switching circuit in an LED lamp according to an embodiment of the present invention. Referring to FIG. 20F, a mode switching circuit 1780 includes a mode switch 1781 suitable for use with the driving circuit 1830 in FIG. 19D. Referring to FIGS. 20F and 19D, mode switch 1781 has three terminals 1783, 1784, and 1785, wherein terminal 1783 is coupled to filtering output terminal 521, terminal 1784 is coupled to driving output terminal 1521, and terminal 1785 is coupled to inductor 1832 in driving circuit 1830.

When mode switching circuit 1780 determines to perform a first driving mode, mode switch 1781 conducts current in a first conductive path through terminals 1783 and 1785 and a second conductive path through terminals 1783 and 1784 is in a cutoff state. In this case, filtering output terminal 521 is coupled to inductor 1832, and therefore driving circuit 1830 is working normally, which working includes receiving a filtered signal from filtering output terminals 521 and 522 and then transforming the filtered signal into a driving signal, output at driving output terminals 1521 and 1522 for driving the LED module.

When mode switching circuit 1780 determines to perform a second driving mode, mode switch 1781 conducts current in the second conductive path through terminals 1783 and 1784 and the first conductive path through terminals 1783 and 1785 is in a cutoff state. In this case, driving output terminal 1521 is coupled to filtering output terminal 521, and therefore driving circuit 1830 stops working, and a filtered signal is input through filtering output terminals 521 and 522 to driving output terminals 1521 and 1522 for driving the LED module, while bypassing inductor 1832 and switch 1835 in driving circuit 1830.

Figure 20G:
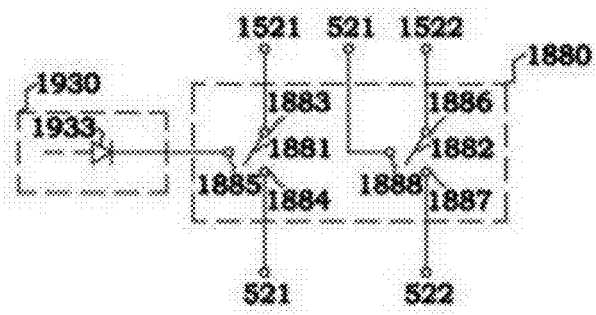
FIG. 20G is a schematic diagram of a mode switching circuit in an LED lamp according to some embodiments.

FIG. 20G is a schematic diagram of the mode switching circuit in an LED lamp according to an embodiment of the present invention. Referring to FIG. 20G, a mode switching circuit 1880 includes mode switches 1881 and 1882 suitable for use with the driving circuit 1930 in FIG. 19E. Referring to FIGS. 20G and 19E, mode switch 1881 has three terminals 1883, 1884, and 1885, wherein terminal 1883 is coupled to driving output terminal 1521, terminal 1884 is coupled to filtering output terminal 521, and terminal 1885 is coupled to freewheeling diode 1933 in driving circuit 1930. And mode switch 1882 has three terminals 1886, 1887, and 1888, wherein terminal 1886 is coupled to driving output terminal 1522, terminal 1887 is coupled to filtering output terminal 522, and terminal 1888 is coupled to filtering output terminal 521.

When mode switching circuit 1880 determines to perform a first driving mode, mode switch 1881 conducts current in a first conductive path through terminals 1883 and 1885 and a second conductive path through terminals 1883 and 1884 is in a cutoff state, and mode switch 1882 conducts current in a third conductive path through terminals 1886 and 1888 and a fourth conductive path through terminals 1886 and 1887 is in a cutoff state. In this case, driving output terminal 1521 is coupled to freewheeling diode 1933, and filtering output terminal 521 is coupled to driving output terminal 1522. Therefore, driving circuit 1930 is working normally, which working includes receiving a filtered signal from filtering output terminals 521 and 522 and then transforming the filtered signal into a driving signal, output at driving output terminals 1521 and 1522 for driving the LED module.

When mode switching circuit 1880 determines to perform a second driving mode, mode switch 1881 conducts current in the second conductive path through terminals 1883 and 1884 and the first conductive path through terminals 1883 and 1885 is in a cutoff state, and mode switch 1882 conducts current in the fourth conductive path through terminals 1886 and 1887 and the third conductive path through terminals 1886 and 1888 is in a cutoff state. In this case, driving output terminal 1521 is coupled to filtering output terminal 521, and filtering output terminal 522 is coupled to driving output terminal 1522. Therefore, driving circuit 1930 stops working, and a filtered signal is input through filtering output terminals 521 and 522 to driving output terminals 1521 and 1522 for driving the LED module, while bypassing freewheeling diode 1933 and switch 1935 in driving circuit 1930.

Figure 20H:
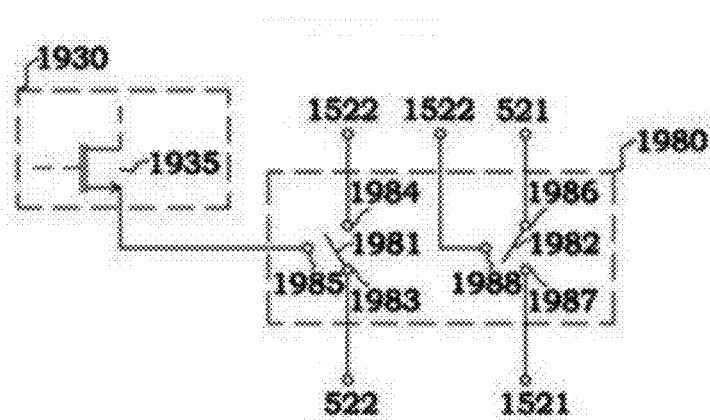
FIG. 20H is a schematic diagram of a mode switching circuit in an LED lamp according to some embodiments.

FIG. 20H is a schematic diagram of the mode switching circuit in an LED lamp according to an embodiment of the present invention. Referring to FIG. 20H, a mode switching circuit 1980 includes mode switches 1981 and 1982 suitable for use with the driving circuit 1930 in FIG. 19E. Referring to FIGS. 20H and 19E, mode switch 1981 has three terminals 1983, 1984, and 1985, wherein terminal 1983 is coupled to filtering output terminal 522, terminal 1984 is coupled to driving output terminal 1522, and terminal 1985 is coupled to switch 1935 in driving circuit 1930. And mode switch 1982 has three terminals 1986, 1987, and 1988, wherein terminal 1986 is coupled to filtering output terminal 521, terminal 1987 is coupled to driving output terminal 1521, and terminal 1988 is coupled to driving output terminal 1522.

When mode switching circuit 1980 determines to perform a first driving mode, mode switch 1981 conducts current in a first conductive path through terminals 1983 and 1985 and a second conductive path through terminals 1983 and 1984 is in a cutoff state, and mode switch 1982 conducts current in a third conductive path through terminals 1986 and 1988 and a fourth conductive path through terminals 1986 and 1987 is in a cutoff state. In this case, driving output terminal 1522 is coupled to filtering output terminal 521, and filtering output terminal 522 is coupled to switch 1935. Therefore, driving circuit 1930 is working normally, which working includes receiving a filtered signal from filtering output terminals 521 and 522 and then transforming the filtered signal into a driving signal, output at driving output terminals 1521 and 1522 for driving the LED module.

When mode switching circuit 1980 determines to perform a second driving mode, mode switch 1981 conducts current in the second conductive path through terminals 1983 and 1984 and the first conductive path through terminals 1983 and 1985 is in a cutoff state, and mode switch 1982 conducts current in the fourth conductive path through terminals 1986 and 1987 and the third conductive path through terminals 1986 and 1988 is in a cutoff state. In this case, driving output terminal 1521 is coupled to filtering output terminal 521, and filtering output terminal 522 is coupled to driving output terminal 1522. Therefore, driving circuit 1930 stops working, and a filtered signal is input through filtering output terminals 521 and 522 to driving output terminals 1521 and 1522 for driving the LED module, while bypassing freewheeling diode 1933 and switch 1935 in driving circuit 1930.

It's worth noting that the mode switches in the above embodiments may each comprise, for example, a single-pole double-throw switch, or comprise two semiconductor switches (such as metal oxide semiconductor transistors), for switching a conductive path on to conduct current while leaving the other conductive path cutoff. Each of the two conductive paths provides a path for conducting the filtered signal, allowing the current of the filtered signal to flow through one of the two paths, thereby achieving the function of mode switching or selection. For example, with reference to FIGS. 11A, 11B, and 11D in addition, when the lamp driving circuit 505 is not present and the LED tube lamp 500 is directly supplied by the AC power supply 508, the mode switching circuit may determine on performing a first driving mode in which the driving circuit (such as driving circuit 1530, 1630, 1730, 1830, or 1930) transforms the filtered signal into a driving signal of a level meeting a required level to properly drive the LED module to emit light. On the other hand, when the lamp driving circuit 505 is present, the mode switching circuit may determine on performing a second driving mode in which the filtered signal is (almost) directly used to drive the LED module to emit light; or alternatively the mode switching circuit may determine on performing the first driving mode to drive the LED module to emit light.

The LED tube lamps according to various different embodiments of the present invention are described as above.

According to examples of the power supply module, the external driving signal may be low frequency AC signal (e.g., commercial power), high frequency AC signal (e.g., that provided by a ballast), or a DC signal (e.g., that provided by a battery), input into the LED tube lamp through a drive architecture of single-end power supply or dual-end power supply. For the drive architecture of dual-end power supply, the external driving signal may be input by using only one end thereof as single-end power supply.

The LED tube lamp may omit the rectifying circuit when the external driving signal is a DC signal.

According to the design of the LED lighting module according to some embodiments, the LED lighting module may comprise the LED module and a driving circuit or only the LED module.

According to the design of the mode determination circuit in some embodiments, the mode determination circuit may be connected to the rectifying circuit for detecting the state of the property of the rectified signal to selectively determine whether to perform a first mode or a second mode of lighting according to the state of the property of the rectified signal. Accordingly, the LED tube lamp is compatible with different types of the electrical ballasts, e.g. electronic ballasts and inductive (or magnetic) ballasts.

According to the design of the mode determination circuit in some embodiments, the mode determination circuit may be connected to the electrical ballast for detecting the state of the property of the external driving signal to selectively determine whether to perform a first mode or a second mode of lighting according to the state of the property of the external driving signal. Accordingly, the LED tube lamp is compatible with different types of the electrical ballasts, e.g. electronic ballasts and inductive ballasts.

According to the design of the mode determination circuit in some embodiments, the mode determination circuit includes a ballast interface circuit as an interface between the LED tube lamp and electrical ballast used to supply the LED tube lamp. Accordingly, the LED tube lamp is compatible with different types of the electrical ballasts, e.g. electronic ballasts and inductive ballasts.

According to the design of the mode determination circuit in some embodiments, the mode determination circuit includes a discharge device to be conducted when welding defects existed between the positive electrodes of the LED unit and the negative electrodes of the LED unit for preventing the LED unit from arcing.

The above-mentioned features can be accomplished in any combination to improve the LED tube lamp, and the above embodiments are described by way of example only. The present invention is not herein limited, and many variations are possible without departing from the spirit of the present invention and the scope as defined in the appended claims.

What is claimed is:

1. A light emitting diode (LED) tube lamp configured to receive an external driving signal, comprising:
an LED module for emitting light, the LED module comprising an LED unit comprising an LED;
a rectifying circuit for rectifying the external driving signal to produce a rectified signal, wherein the rectifying circuit has a first output terminal and a second output terminal for outputting the rectified signal;
a mode determination circuit configured to detect a state of a property of the rectified signal, for selectively determining on performing a first mode or a second mode of lighting according to the state of the property of the rectified signal; wherein the mode determination circuit is configured such that when the LED tube lamp performs the first mode of lighting, the mode determination circuit allows continual current to flow through the LED unit until the external driving signal is disconnected from the LED tube lamp; and when the LED tube lamp performs the second mode of lighting, the mode determination circuit regulates the continuity of current to flow through the LED unit; and
a noise suppressing circuit comprising an inductor coupled between the LED unit and an output terminal of the mode determination circuit, wherein the inductor has a first end and a second end, the first end is connected to a cathode terminal of the LED unit, and the noise suppressing circuit further comprises:
a resistor connected in series with the inductor between the inductor and the output terminal of the mode determination circuit; and
a transistor having a first terminal, a second terminal, and a third terminal, the first terminal connected to a connection node between the inductor and the LED unit, the second terminal and the third terminal respectively connected to two ends of the resistor, wherein the transistor is configured to conduct current according to a voltage drop of the resistor; wherein the transistor is configured such that a conducting state of the transistor diverts some current from flowing through the inductor.

2. The LED tube lamp according to claim 1, wherein the mode determination circuit comprises: a voltage divider for producing a first fraction voltage of the rectified signal and a second fraction voltage of the rectified signal; and a control circuit for determining whether the voltage level of the first fraction voltage is in a first voltage range, and whether the voltage level of the second fraction voltage is in a second voltage range; wherein when the first fraction voltage signal is in the first voltage range, the mode determination circuit determines on performing the first mode of lighting; and when the second fraction voltage is in the second voltage range, the mode determination circuit determines on performing the second mode of lighting.

3. The LED tube lamp according to claim 2, wherein the control circuit comprises a switching circuit; when the LED tube lamp performs the first mode of lighting, the mode determination circuit allows continuous current to flow through the LED unit by continuously turning on the switching circuit; and when the LED tube lamp performs the second mode of lighting, the mode determination circuit allows discontinuous current to flow through the LED unit by alternately turning on and off the switching circuit.

4. The LED tube lamp according to claim 3, wherein the switching circuit has two terminals respectively coupled to the LED unit and a reference voltage.

5. The LED tube lamp according to claim 2, further comprising a switching circuit; when the LED tube lamp performs the first mode of lighting, the mode determination circuit allows continuous current to flow through the LED unit by continuously turning on the switching circuit; and when the LED tube lamp performs the second mode of lighting, the mode determination circuit allows discontinuous current to flow through the LED unit by alternately turning on and off the switching circuit.

6. The LED tube lamp according to claim 5, wherein the switching circuit has two terminals respectively coupled to the LED unit and a reference voltage.

7. The LED tube lamp according to claim 2, wherein the rectifying circuit has a first output terminal and a second output terminal for outputting the rectified signal, and the voltage divider comprises: a first voltage divider comprising a first resistor and a second resistor connected to each other between the first and second output terminals of the rectifying circuit, to produce the first fraction voltage; and a second voltage divider comprising a third resistor and a fourth resistor connected to each other between the first and second output terminals of the rectifying circuit, to produce the second fraction voltage; wherein the control circuit is coupled to a connection node between the first resistor and the second resistor, for receiving the first fraction voltage; and the control circuit is coupled to a connection node between the third resistor and the fourth resistor, for receiving the second fraction voltage.

8. The LED tube lamp according to claim 1, further comprising a filtering circuit connected in parallel with the LED unit.

9. The LED tube lamp according to claim 1, wherein the property is the voltage level or the frequency level of the rectified signal.

10. The LED tube lamp according to claim 1, wherein the mode determination circuit is configured such that upon the external driving signal being initially input to the LED tube lamp, the mode determination circuit will not enter a conduction state until a period of delay passes, wherein the period of delay is between about 10 milliseconds and about 1 second.

* * * * *